US012225402B2

(12) United States Patent
Poe et al.

(10) Patent No.: US 12,225,402 B2
(45) Date of Patent: Feb. 11, 2025

(54) NETWORK ENTITIES FOR MANAGING DISTRIBUTION OF SLICE SERVICE LEVEL AGREEMENT INFORMATION IN A COMMUNICATION NETWORK

(71) Applicant: Huawei Technologies Co., Ltd., Shenzhen (CN)

(72) Inventors: Wint Yi Poe, Munich (DE); Riccardo Trivisonno, Munich (DE); Clarissa Marquezan, Munich (DE); Mirko Schramm, Berlin (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 281 days.

(21) Appl. No.: 17/740,021

(22) Filed: May 9, 2022

(65) Prior Publication Data
US 2022/0264357 A1    Aug. 18, 2022

Related U.S. Application Data

(63) Continuation of application No. PCT/EP2019/080577, filed on Nov. 7, 2019.

(51) Int. Cl.
*H04W 28/02* (2009.01)
*H04W 48/18* (2009.01)

(52) U.S. Cl.
CPC ... *H04W 28/0247* (2013.01); *H04W 28/0263* (2013.01); *H04W 28/0268* (2013.01); *H04W 48/18* (2013.01)

(58) Field of Classification Search
CPC ......... H04W 28/0247; H04W 28/0263; H04W 28/0268; H04W 48/18; H04W 28/24; H04L 41/5003
See application file for complete search history.

(56) References Cited

U.S. PATENT DOCUMENTS

2017/0359749 A1   12/2017   Dao
2018/0123878 A1   5/2018   Li et al.
(Continued)

FOREIGN PATENT DOCUMENTS

CN   108141470 A   6/2018
CN   108282352 A   7/2018
(Continued)

OTHER PUBLICATIONS

"3rd Generation Partnership Project; Technical Specification Group Services and System Aspects; Telecommunication management; Charging management; Online Charging System (OCS): Applications and interfaces (Release 15)," 3GPP TS 32.296 V15.0.0, pp. 1-94, 3rd Generation Partnership Project, Valbonne, France (Jun. 2018).

(Continued)

*Primary Examiner* — Donald L Mills
(74) *Attorney, Agent, or Firm* — Leydig, Voit & Mayer, Ltd.

(57) ABSTRACT

A network entity for controlling distribution of slice service level agreement (SLA) information of a network slice in a mobile communication network is provided, wherein the network entity is configured to: obtain a plurality of slice SLA indications, wherein each slice SLA indication is obtained from a network control entity of a first plurality of network control entities; and provide to a network control entity local slice SLA information, wherein the local slice SLA information is based on the obtained plurality of slice SLA indications. A network control entity for supporting distribution of slice service level agreement (SLA) information for a mobile communication network is provided, wherein the network control entity is configured to: provide a plurality of slice SLA indications to a network entity for controlling distribution of slice SLA information of a net- (Continued)

work slice; obtain local slice SLA information related to a network slice from a second entity, wherein the local slice SLA information is based on the obtained plurality of slice SLA indications.

20 Claims, 21 Drawing Sheets

(56) References Cited

U.S. PATENT DOCUMENTS

| | | | |
|---|---|---|---|
| 2018/0132138 A1 | 5/2018 | Senarath et al. | |
| 2018/0317134 A1 | 11/2018 | Leroux et al. | |
| 2019/0014014 A1 | 1/2019 | Burke et al. | |
| 2019/0053104 A1 | 2/2019 | Qiao et al. | |
| 2021/0136674 A1* | 5/2021 | Lee | H04L 41/5009 |
| 2022/0022090 A1* | 1/2022 | Schliwa-Bertling | H04L 41/5009 |
| 2022/0369204 A1* | 11/2022 | Jeong | H04W 28/0942 |

FOREIGN PATENT DOCUMENTS

| | | |
|---|---|---|
| CN | 109743213 A | 5/2019 |
| CN | 109891829 A | 6/2019 |
| CN | 109982415 A | 7/2019 |
| CN | 110120879 A | 8/2019 |
| EP | 3402232 A1 | 11/2018 |
| EP | 3507968 B1 | 9/2020 |
| WO | 2018175029 A1 | 9/2018 |
| WO | 2019081005 A1 | 5/2019 |
| WO | 2019158220 A1 | 8/2019 |

OTHER PUBLICATIONS

GSMA Association "Generic Network Slice Template," Official Document NG.116, Version 1.0, pp. 1-60 (May 23, 2019).

"3rd Generation Partnership Project; Technical Specification Group Services and System Aspects; Policy and Charging Control Framework for the 5G System (5GS); Stage 2 (Release 16)," 3GPP TS 23.503 V16.2.0, pp. 1-104, 3rd Generation Partnership Project, Valbonne, France (Sep. 2019).

"3rd Generation Partnership Project; Technical Specification Group Services and System Aspects; System Architecture for the 5G System (5GS); Stage 2 (Release 16)," 3GPP TS 23.501 V16.2.0, pp. 1-391, 3rd Generation Partnership Project, Valbonne, France (Sep. 2019).

"3rd Generation Partnership Project; Technical Specification Group Services and System Aspects; Procedures for the 5G System (5GS); Stage 2 (Release 16)," 3GPP TS 23.502 V16.2.0, pp. 1-525, 3rd Generation Partnership Project, Valbonne, France (Sep. 2019).

"3rd Generation Partnership Project; Technical Specification Group Services and System Aspects; Study of Enablers for Network Automation for 5G (Release 16)," 3GPP TR 23.791 V16.2.0, pp. 1-124, 3rd Generation Partnership Project, Valbonne, France (Jun. 2019).

"3rd Generation Partnership Project; Technical Specification Group Services and System Aspects; Management and orchestration; Concepts, use cases and requirements (Release 16)," 3GPP TS 28.530 V16.0.0, pp. 1-29, 3rd Generation Partnership Project, Valbonne, France (Sep. 2019).

"3rd Generation Partnership Project; Technical Specification Group Services and System Aspects; Telecommunication management; Study on management aspects of communication services (Release 16)," 3GPP TR 28.805 V16.0.0, pp. 1-42, 3rd Generation Partnership Project, Valbonne, France (Sep. 2019).

"New WID Study on Enhancement of Network Slicing Phase 2," 3GPP TSG|WG-SA WG2 Meeting #134, Sapporo, Japan, S2-1907289, Total 3 pages, 3rd Generation Partnership Project, Valbonne, France (Jun. 24-28, 2019).

"New WID Study on Enhancement of Network Slicing Phase 2," 3GPP TSG|WG-SA WG2 Meeting #134, Sapporo, Japan, S2-1908583, Total 3 pages, 3rd Generation Partnership Project, Valbonne, France (Jun. 24-28, 2019).

TM Forum "SLA Management Handbook," Release 3.1, GB917, TM Forum Approved Version 1.2, pp. 1-127, Morristown, NJ, USA (Nov. 2012).

Huawei et al., "OI#4j: Terminology rationalisation and SLA simplification for network slicing (502)," SA WG2 Meeting #124, Reno, U.S. of America, S2-178839, Total 27 pages, 3rd Generation Partnership Project, Valbonne, France (Nov. 27-Dec. 1, 2017).

* cited by examiner

| Information name | Description | Category |
|---|---|---|
| S-NSSAI information | The Network Slice information specific to the Slice SLA policy | M |
| Slice SLA Parameters | The information of Slice SLA parameters for Slice SLA policy association | M |
| Slice SLA Parameter Type | The type of each Slice SLA parameter | M |
| Slice SLA Parameter Objectives | The service level objective(s) of each slice SLA parameter | M |
| Slice SLA Parameter Status | The actual value of the Slice SLA Parameter(s) | O |
| NFs information | The information of NFs required to execute Slice SLA Policy Enforcement | |
| List of NFs | The list of NFs required to enforced Slice SLA policy | O |
| NF Status | The status of each NF w.r.t the Slice SLA parameter type(s) and status | O |
| ... | | |

Fig. 10

NETWORK ENTITIES FOR MANAGING DISTRIBUTION OF SLICE SERVICE LEVEL AGREEMENT INFORMATION IN A COMMUNICATION NETWORK

CROSS-REFERENCE TO RELATED APPLICATIONS

This application is a continuation of International Application No. PCT/EP2019/080577, filed on Nov. 7, 2019, the disclosure of which is hereby incorporated by reference in its entirety.

FIELD

In general, the present disclosure relates to the field of mobile communication networks. More specifically, the present disclosure relates to network entities for managing distributing of slice service level agreement information of a network slice at the control plane in a mobile communication network.

BACKGROUND

The 5$^{th}$ generation (5G) mobile telecommunication technology with Network Slicing feature creates a new business opportunity for operators and vendors to open a new market for verticals integration. Verticals, e.g., manufacturing and/or automotive industry may use 5G technology as a communication service, in particular, a communication service comprises at least one of a Network Slice (NS), a Network Slice as a Service (NSaaS) or a communication service (CS) composed of Network Slice(s), to enhance their products and solutions.

To enable this a new business model is innovated between Operators and Verticals for a specific 5G communication service (i.e., NS or NSaaS or CS). Basically, the new business model for a specific service is associated with service level agreement (SLA) policies. In particular, the SLA is identified for a specific 5G communication service (i.e., NS or NSaaS or CS) between two parties: 5G communication service provider and 5G communication service Customer. For example, an operator offers a 5G communication service (e.g., enhanced mobile broadband (eMBB) slice as a service) to a Vertical (e.g., an automotive company) for vehicular related communication service. The automotive company requests the offered 5G communication service (i.e., eMBB slice as a service) from the operator and negotiates the SLA including technical and business requirements and/or expectations for the 5G communication service.

A high level concept of a slice SLA for a communication service (e.g., NSaaS) between an operator 101 (e.g., network operator B (NOP-B)) and a vertical 103 (e.g., Vertical-X) is illustrated in FIG. 1. The slice specific technical requirements can be used to describe with the Global System for Mobile Communications Association (GSMA) defined Generic network Slice Template (GST). Basically, the GSMA introduce GST with a set of GST attributes. The attributes in the GST point explicitly to the definition of attributes and bounds on the communication service delivered to the end customer, i.e. vertical customer 105. In particular, the attributes and bounds on the communication service of GST contain network slice specific attributes that can be used to characterize a network slice.

A slice SLA, i.e. a slice-specific technical requirements of the SLA of a communication service, can be defined as the network slice specific GST attributes and bounds on the communication service (e.g., NS, NSaaS, CS) which has been agreed between the communication service provider (e.g., an operator) and the communication service customer (e.g., a vertical provider). Based on the slice SLA, the communication service provider (e.g., the operator) would require a mechanism to control and manage the slice SLA fulfilments and assurance.

In light of the above, there is a need for improved network entities, allowing for managing distribution of slice service level agreement information of a network slice in a mobile communication network.

SUMMARY

Embodiments of the present disclosure provide improved network entities, allowing managing slice service level agreement information of a network slice in a slice-oriented mobile communication network in an efficient manner.

The foregoing is achieved by the subject matter of the independent claims. Further implementation forms are apparent from the dependent claims, the description and the figures.

Generally, the present disclosure relates to network entities for managing distribution of slice service level agreement (SLA) information of a network slice in a mobile communication network. Embodiments of the present disclosure support slice SLA policies in a 5G core network (5GC) to support at least one of slice SLA parameters: a maximum number of UEs per Network Slice, a maximum number of PDU sessions per Network Slice, a guaranteed number of UEs per Network Slice, a guaranteed number of PDU sessions per Network Slice, a maximum Downlink (DL) throughput per Network Slice, a guaranteed (minimum) Downlink (DL) throughput per Network Slice, a maximum Uplink (UL) throughput per Network Slice, and/or a guaranteed (minimum) Uplink (UL) throughput per Network Slice.

More specifically, according to a first aspect the disclosure relates to a network entity for controlling distribution of slice service level agreement (SLA) information of a network slice in a mobile communication network, wherein the network entity is configured to: obtain a plurality of slice SLA indications, wherein each slice SLA indication is obtained from a network control entity of a first plurality of network control entities; and provide to a network control entity local slice SLA information, wherein the local slice SLA information is based on the obtained plurality of slice SLA indications.

Thus, an improved network entity is provided, allowing for controlling distribution of slice SLA information of a network slice in a mobile communication network efficiently.

In a further possible implementation form of the first aspect, the local slice SLA information is further based on global slice SLA information.

In a further possible implementation form of the first aspect, the network entity is further configured to provide to each of a plurality of network control entities a corresponding local slice SLA information.

Thus, the network entity can provide more than one network control entity with the local slice SLA information in an efficient manner.

In a further possible implementation form of the first aspect, each of the plurality of slice SLA indications comprises at least one of: local status information, wherein the local status information is based on a policy counter value related to the local slice SLA information of the network control entity; update indication, wherein the update indication is based on a quota related to the local slice SLA information; delegation request of quota enforcement for enforcing a quota based on global slice SLA information, the delegation request comprising a SLA parameter, identification of the network slice and/or identification of the slice SLA information, and/or the identification of network operational procedures related to the SLA parameter.

Thus, the slice SLA information of a network slice can be efficiently distributed to multiple different network entities or network functions in the mobile communication network.

In a further possible implementation form of the first aspect, the obtained slice SLA indication includes a delegation request of quota enforcement and the network entity is further configured to provide to another network entity a response to the delegation request, wherein the response to the delegation request comprises acceptance or rejection of the network operational procedures; or provide to the network control entity the SLA parameter, identification of the network slice and/or identification of the slice SLA information, and/or the identification of network operational procedures related to the SLA parameter, acceptance or rejection indication for the network operational procedures.

In a further possible implementation form of the first aspect, the global or local slice SLA information includes at least one of: network slice identification; a mapping of subscribers identification to the network slice identification; at least one slice SLA parameter and a corresponding Service Level Objective (SLO); at least one network operational procedure corresponding to the SLA parameter; at least one quota, wherein the quota indicates an upper bound to the network operational procedures; a mapping of at least one network function identification and/or at least one network function set identification to a network slice identification; a mapping of at least one subscriber identification to at least one network operational procedure.

The Network Slice identification comprises Single Network Slice Selection Assistance Information (S-NSSAI) and/or Network Slice Instance (NSI) and/or the association of the combination of S-NSSAI(s) and/or NSI(s). The subscribers identification comprises SUPI or a list of SUPIs for the associated network slice.

In an embodiment, an exemplary slice SLA parameter is the number of user equipments per network slice and its corresponding SLO can be a maximum number of allowed user equipments per network slice and/or a guaranteed number of user equipments per network slice.

In an embodiment, exemplary network operational procedures can be registration and deregistration procedures for the slice SLA parameter "number of user equipments per network slice."

In an embodiment, an exemplary quota can be the maximum number of accepted PDU session establishments in a network operational procedure.

Thus, the slice SLA information of a network slice can be efficiently distributed to multiple different network entities or network functions in the mobile communication network.

According to a second aspect the disclosure relates to a network control entity for supporting distribution of slice service level agreement (SLA) information for a mobile communication network, the network control entity being configured to: provide one or more slice SLA indications to a network entity for controlling distribution of slice SLA information of a network slice; and obtain local slice SLA information related to a network slice from the network entity, wherein the local slice SLA information is based on at least one of the one or more slice SLA indications provided to network entity.

Thus, an improved network entity is provided, allowing for supporting distribution of slice SLA information of a network slice in a mobile communication network efficiently.

In a further possible implementation form of the second aspect, the one or more slice SLA indications comprises at least one of: local status information, wherein the local status information is based on a policy counter value related to the local slice SLA information of the network control entity; update indication, wherein the update indication is based on a quota related to the local slice SLA information; delegation request of quota enforcement for enforcing a quota based on global slice SLA information, the delegation request comprising a SLA parameter, identification of the network slice and/or identification of the slice SLA information, and/or the identification of network operational procedures related to the SLA parameter.

Thus, the slice SLA information of a network slice can be efficiently distributed to multiple different network entities or network functions in the mobile communication network.

In a further possible implementation form of the second aspect, the network control entity is further configured to generate a policy counter for monitoring the SLA parameter, the policy counter indicating: the quota comprising information of available communication resources and consumed communication resources.

Thus, the network control entity can monitor a SLA parameter timely and efficiently.

In a further possible implementation form of the second aspect, the slice SLA indication includes a delegation request of quota enforcement and the network control entity is further configured to obtain from the network entity, in response to the delegation request of quota enforcement, the SLA parameter, identification of the network slice and/or identification of the slice SLA information, and/or the identification of network operational procedures related to the SLA parameter, acceptance or rejection indication for the network operational procedures.

In a further possible implementation form of the second aspect, the global or local slice SLA information comprises at least one of: network slice identification; a mapping of subscribers identification to the network slice identification; at least one slice SLA parameter and a corresponding Service Level Objective (SLO); at least one network operational procedure corresponding to the SLA parameter; at least one quota, wherein the quota indicates an upper bound to the network operational procedures; a mapping of at least one network function identification and/or at least one network function set identification to a network slice identification; a mapping of at least one subscriber identification to at least one network operational procedure.

Thus, the slice SLA information of a network slice can be efficiently distributed to multiple different network entities or network functions in the mobile communication network.

In a further possible implementation form of the second aspect, the network control entity is configured to: send towards a network entity a status of the policy counter indicating the amount of consumed communication resources, and/or receive an update status from the network entity, the update status indicating an updated amount of available communication resources of the network control entity, wherein the network control entity is configured to modify the policy counter on the basis of the update status received from the network entity.

Thus, the slice SLA information of a network slice can be efficiently distributed to the network functions for providing a corresponding communication services in the mobile communication network.

In a further possible implementation form of the second aspect, the network control entity is configured to send a request to the network entity for increasing the quota, and obtain the update status received from the network entity.

Thus, the network control entity can adjust the quota for communication resources to be used by the network function efficiently.

In a further possible implementation form of the second aspect, the SLA parameter comprises at least one of a maximum number of user equipments per network slice, a guaranteed number of user equipments per network slice, a maximum number of packet data unit (PDU) sections per network slice, a guaranteed number of PDU sections per network slice, a maximum downlink throughput per network slice, a guaranteed downlink throughput per network slice, a maximum uplink throughput per network slice, a guaranteed uplink throughput per network slice.

Thus, the slice service level agreement policies of a network slice can be determined efficiently.

In a further possible implementation form of the second aspect, the network control entity is configured to receive a procedure information from the first network function wherein the network control entity is configured to send a message towards the first network function. The message is based on the quota status and indicates one of the following actions: acceptance of the procedure information, rejection of the procedure information, or request to re-send the procedure information. A request to re-send the procedure information comprises the back-off timer and a suitable cause value.

The procedure information may comprise a request to provide a decision for quota enforcement.

Thus, the network control entity can monitor and adjust the communication resources for the first network function efficiently.

In a further possible implementation form of the second aspect, the procedure information comprises a request for registering a user entity to the network slice by the first network function, and/or a request for establishing a section connection between a user entity and the network slice by the first network function.

Thus, the network control entity can monitor and adjust the communication resources for the first network function to perform registration and section connection procedures efficiently.

According to a third aspect the disclosure relates to a network management system for managing distribution of slice SLA information of a network slice in a mobile communication network, wherein the network management system comprises: a network entity according to the first aspect for controlling distribution of the slice SLA information in the mobile communication network; and a network control entity according to the second aspect for supporting distribution of the slice SLA information for the mobile communication network.

Thus, an improved network management system is provided, allowing for managing distribution of slice SLA information of a network slice in a mobile communication network efficiently.

According to a fourth aspect the disclosure relates to a method for controlling distribution of slice SLA information of a network slice in a mobile communication network. The method comprises the following steps: obtaining a plurality of slice SLA indications, wherein each slice SLA indication is obtained from a network control entity of a first plurality of network control entities; providing to a network control entity local slice SLA information, wherein the local slice SLA information is based on the obtained plurality of slice SLA indications.

Thus, an improved method is provided, allowing for controlling distribution of slice SLA information of a network slice in a mobile communication network efficiently.

According to a fifth aspect the disclosure relates to a method for supporting distribution of slice SLA information for a mobile communication network, wherein the method comprises: providing one or more slice SLA indications to a network entity for controlling distribution of slice SLA information of a network slice; and obtaining local slice SLA information related to a network slice from the network entity, wherein the local slice SLA information is based on at least one of the one or more slice SLA indications provided to network entity.

Thus, an improved method is provided, allowing for supporting distribution of slice SLA information of a network slice in a mobile communication network efficiently.

The disclosure can be implemented in hardware and/or software.

Definitions

Network Slice—a network slice described in this disclosure can be a Single Network Slice Selection Assistance Information (S-NSSAI) defined by the 3GPP SA2 working group or a Network Slice Instance (NSI) defined by 3GPP the SA2/SA5 terminology or a combination of S-NSSAI(s) and/or NSI(s) dedicated to a specific customer (e.g., a vertical customer).

Network Slice Identifications—it comprises the identifications of one or more S-NSSAIs or one or more Network Slice Instances (NSI) or a combination of both.

Type of Network Slice—a type of network slice can be any one of standardized network slice types, i.e. Enhanced Mobile Broadband (eMBB), Massive IoT (MIoT), Ultra-reliable low latency communication (URLLC), Vehicle-to-everything (V2X) defined in the specification 3GPP TS23.501 v16.2.0.

Slice SLA—the service level agreement (SLA) between service/slice provider (e.g., operator) and service/slice customer (e.g., vertical provider) for a communication service (i.e., NS or NSaaS or CS), in particular, including Slice SLA parameter(s) with Service Level Objectives (SLO), where the actual SLO will be slice/service specific and will be driven by the service/slice customer (e.g., Vertical Provider) and business expectations for the slice/service. The SLO information should include details of how the SLO will be measured including the source for the data.

Slice SLA parameter—GSMA-defined Generic Network Slice Template (GST) attributes and/or slice related SLA parameter that can characterize a type of network slice. Slice SLA parameters comprise at least one of a maximum number of user equipments (UEs) per Network Slice, a guaranteed number of UEs per network slice, a maximum number of packet data unit (PDU) sessions per Network Slice, a guaranteed (or minimum) number of PDU sessions per Network Slice, a maximum Downlink (DL) throughput per Network Slice, a guaranteed (minimum) Downlink (DL) throughput per Network Slice, a maximum Uplink (UL) throughput per Network Slice, a guaranteed (or minimum) Uplink (UL) throughput per Network Slice. A slice SLA parameter is further defined as slice SLA parameter type.

Slice SLA parameter type—a type of slice SLA parameter defined for a specific Slice SLA parameter. For example, if a slice SLA parameter is a maximum number of UEs (e.g., attached UEs) per Network Slice, a slice SLA parameter type can be "attached UEs". Basically, a slice SLA parameter type or slice SLA parameter is associated with a value.

SLO—service Level Objective as defined in TM Forum: SLA management Handbook, release 3.1, November 2012.

Global value of SLO of a slice SLA parameter—this parameter is defined for the global value of the SLO of a slice SLA parameter of a specific Network Slice. It is also defined as global quota of a slice SLA parameter of a specific Network Slice. Basically, the status of SLO (or global quota) is a summation of the value of slice SLA parameter (type) associated with policy counter(s) for a specific slice SLA parameter (type).

Local Value of Slice SLA parameter (type)—the actual or current value of a slice SLA parameter or a slice SLA parameter type associated with a policy counter.

Policy Counter—a policy counter is defined for a specific Slice SLA parameter or a specific Slice SLA parameter type of a specific Network Slice. Basically, a policy counter can be maintained with four elements: quota; threshold(s); status of policy counter; local value of slice SLA parameter type.

Quota—quota is the percentage of SLO. The percentage can vary between 0 and 100. If quota is equally distributed among the enforcement points, it can be calculated based on the number of active enforcement points and the SLO of a slice SLA parameter.

Threshold—a threshold is used to define an internal control mechanism and/or a mechanism related to the reporting and/or the status of the local value of slice SLA parameter type.

Status of Policy Counter—the status of policy counter is defined by the threshold and the local value of slice SLA parameter type. For example, a policy counter has three thresholds T1, T2 and T3 with four status S1, S2, S3 and S4, as shown in FIG. 7 below. The current local value of slice SLA parameter type is within the thresholds T1 and T2 with the current status to be reported is S2.

NS—the terminology of Network Slice defined in 3GPP specifications TS23.501 v16.2.0, TS23.502 v16.2.0 and TS23.503, v16.2.0.

NSaaS—Network Slice as a Service defined in 3GPP specification TS28.530, v16.0.0. In particular, Network Slice can be created any one or combination of Standardized Network Slice types (i.e., eMBB, mIoT, URLLC, V2X) defined in 3GPP specification TS23.501, v16.2.0.

CS—a communication service composed of Network Slicing features defined in 3GPP SA5 working group e.g., the 3GPP specification TS28.530, v16.0.0.

Number of terminals per Network Slice—this attribute defines the maximum or guaranteed (i.e., minimum) number of terminals supported by a Network Slice. In addition, when counting the number of terminals, it shall apply the status of the terminals. For example, the maximum number of allowed UEs supported byin a NS is taking into consideration of active UEs or registered UE or both cases.

Maximum number of UEs per Network Slice—the maximum number of allowed UEs in a Network Slice (e.g., S-NSSAI or NSI or a combination of S-NSSAI and NSI) where the allowed UEs in a Network Slice can be defined as active UEs or registered UE or both cases.

Terminal—a terminal includes User Equipment (UE) and/ or device and/or terminal supported registered in/attached to/using by a Network Slice (e.g., S-NSSAI) features. The definition of UE applies 3GPP terminology. A device or terminal can be defined as a 5G enable device or terminal.

Number of connections per Network Slice—this attributed describes the maximumnumber of concurrent sessions supported by the Network Slice. A concurrent session can be, e.g. a packet data unit (PDU) session defined by 3GPP.

Maximum number of PDU sessions per Network Slice—the maximum number of allowed PDU sessions in a Network Slice (e.g., S-NSSAI or NSI or a combination of S-NSSAI and NSI) where the allowed PDU sessions in a Network Slice can be defined as attached PDU sessions or active PDU sessions or both cases.

Connections—the concurrent established sessions and/or PDU session defined by 3GPP SA2 terminology (3GPP TS 23.501 v16.2.0: System Architecture for the 5G System).

Available communication resources—Is defined as Number of connections per Network Slice and/or Maximum number of PDU sessions per Network Slice and/or Maximum number of UEs per Network Slice and/or Number of terminals per Network Slice.

Consumed communication resources—is defined as connections and/or terminal.

5GC NFs—The 3GPP SA2 defined 5G Core (5GC) Network Functions.

PCF—a 5GC NF dealing with policy control function (PCF) as defined in 3GPP specifications TS23.501v16.2.0, TS23.502 v16.2.0 and TS23.503 v16.2.0.

UDR—a 5GC NF dealing with unified data repository (UDR) as defined in 3GPP specifications TS23.501, v16.2.0 und TS23.502, v16.2.0.

UDM—a 5GC NF dealing with unified data management (UDM) as defined in 3GPP specifications TS23.501, v16.2.0 und TS23.502, v16.2.0.

BRIEF DESCRIPTION OF THE DRAWINGS

Further embodiments of the present disclosure will be described with respect to the following figures, wherein:

FIG. 10 shows a schematic diagram of a table of slice SLA policy data structure according to an embodiment;

In the various figures, identical reference signs will be used for identical or at least functionally equivalent features.

DETAILED DESCRIPTION

In the following description, reference is made to the accompanying drawings, which form part of the disclosure, and in which are shown, by way of illustration, specific aspects in which the present disclosure may be placed. It will be appreciated that other aspects may be utilized and structural or logical changes may be made without departing from the scope of the present disclosure. The following detailed description, therefore, is not to be taken in a limiting sense, as the scope of the present disclosure is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present disclosure covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

Figure 1:
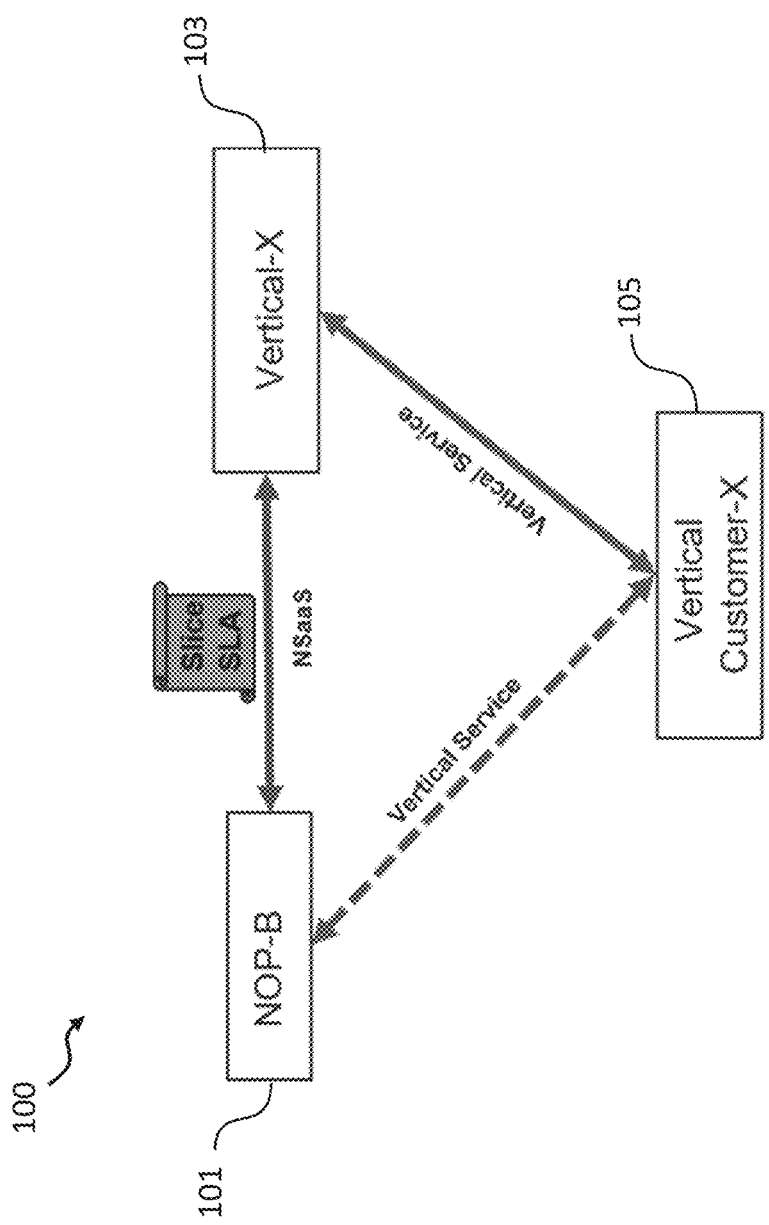
FIG. 1 shows a schematic diagram illustrating a communication network system between an operator, a vertical and a vertical customer.
Figure 2:
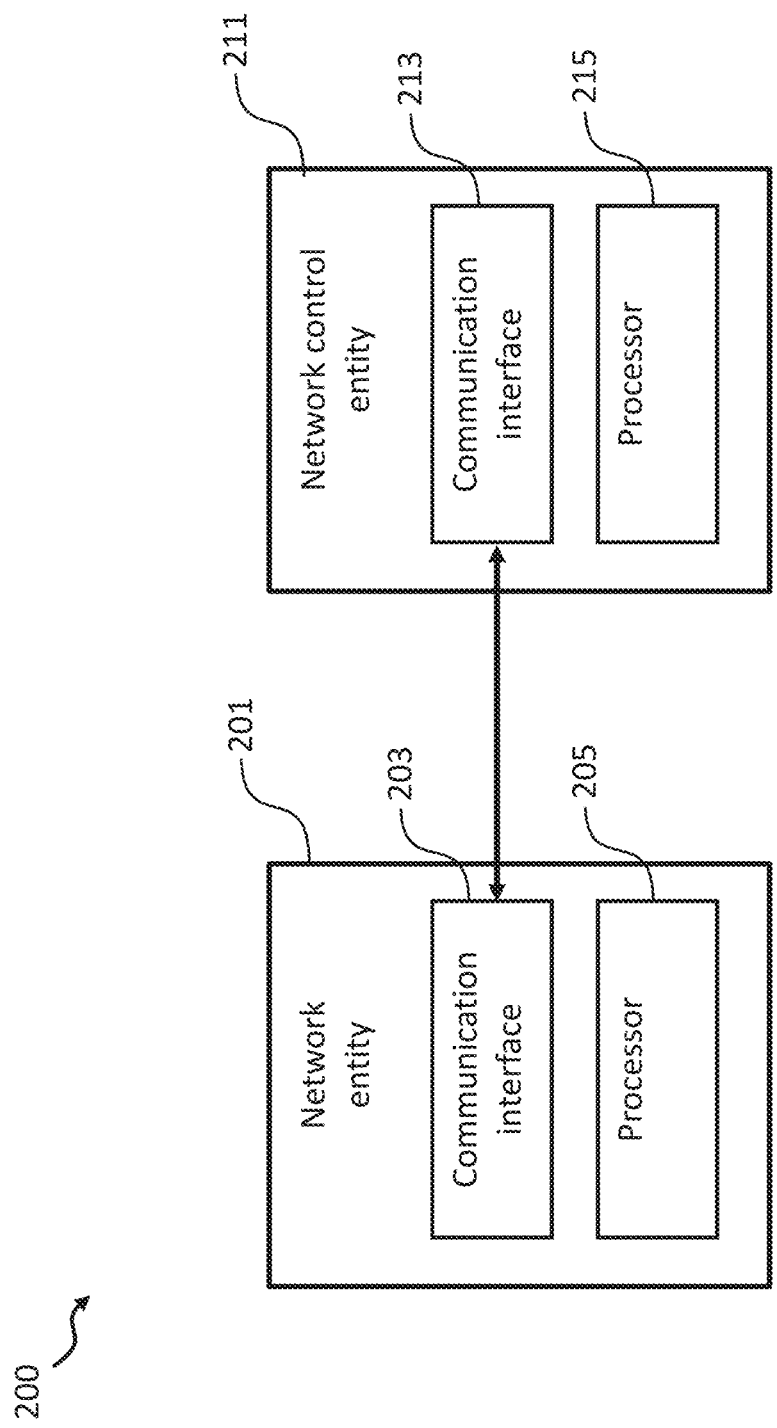
FIG. 2 shows a schematic diagram illustrating a network management system according to an embodiment for managing slice service level agreement (SLA) information in a communication network.

As will be described in more detail under reference to FIG. 2, embodiments of the present disclosure relate to a network management system 200 for managing distribution of slice SLA information of a network slice in a mobile communication network, wherein the network system 200 comprises a network entity 201 and a network control entity 211.

Embodiments of the disclosure can offer in particular the following advantages: enabling 5GS to support future proof support of slice SLA when additional GST attributes need to be supported in 5GC, wherein the GST attributes comprises for instance the number of terminals per Network Slice and/or the number of connections per Network Slice; enabling 5GC to support a slice SLA policy controller and enforcement procedures for the GST attributes under the consideration of multiple enforcements points at 5GC NFs (e.g., multiple PCF instances, multiple UDM/UDR instances); and enabling 5GS to support multi-enforcement points at 5GC NFs (e.g., multiple PCF instances) with non-uniform loaded scenarios, wherein management of slice resources minimizes rejection due to sub-optimal resource distribution compared to load.

More specifically, the network management system 200 comprises a network entity 201 and a network control entity 211 according to an embodiment. Furthermore, the network entity 201 comprises a communication interface 203 and a processor 205 according to an embodiment, and the network control entity 211 comprises a communication interface 213 and a processor 215 according to an embodiment, as shown in FIG. 2. The network entity 201 and the network control entity 211 can send or receive information or data via their communication interfaces 203, 213 respectively.

In an embodiment, the network entity 201 is configured to obtain a plurality of slice SLA indications via the communication interface 203, wherein each slice SLA indication is obtained from a network control entity of a first plurality of network control entities; and the processor 205 of the network entity 201 is configured to provide to the network control entity 211 local slice SLA information, wherein the local slice SLA information is based on the obtained plurality of slice SLA indications. In an embodiment, the local slice SLA information is further based on global slice SLA information.

In an embodiment, the network entity 201 is further configured to provide to each of a plurality of network control entities a corresponding local slice SLA information.

In an embodiment, each of the plurality of slice SLA indications comprises at least one of: local status information, wherein the local status information is based on a policy counter value related to the local slice SLA information of the network control entity; update indication, wherein the update indication is based on a quota related to the local slice SLA information; delegation request of quota enforcement for enforcing a quota based on global slice SLA information, the delegation request comprising a SLA parameter, identification of the network slice and/or identification of the slice SLA information, and/or the identification of network operational procedures related to the SLA parameter.

In an embodiment, the obtained slice SLA indication includes a delegation request of quota enforcement and the network entity 201 is further configured to provide to another network entity a response to the delegation request, wherein the response to the delegation request comprises acceptance or rejection of the network operational procedures; or provide to the network control entity the SLA parameter, identification of the network slice and/or identification of the slice SLA information, and/or the identification of network operational procedures related to the SLA parameter, acceptance or rejection indication for the network operational procedures.

In an embodiment, the global and/or local slice SLA information includes at least one of: network slice identification; a mapping of subscribers identification to the network slice identification; at least one slice SLA parameter and a corresponding Service Level Objective (SLO); at least one network operational procedure corresponding to the SLA parameter; at least one quota, wherein the quota indicates an upper bound to the network operational procedures; a mapping of at least one network function identification and/or at least one network function set identification to a network slice identification; a mapping of at least one subscriber identification to at least one network operational procedure.

In an embodiment, the network control entity 211 is configured to provide a plurality of slice SLA indications to the network entity 201 for controlling distribution of slice SLA information of a network slice; and to obtain local slice SLA information related to a network slice from a second entity via the communication interface 213, wherein the local slice SLA information is based on the obtained plurality of slice SLA indications.

In an embodiment, each of the plurality of slice SLA indications comprises at least one of: local status information, wherein the local status information is based on a policy counter value related to the local slice SLA information of the network control entity; update indication, wherein the update indication is based on a quota related to the local slice SLA information; delegation request of quota enforcement for enforcing a quota based on global slice SLA information, the delegation request comprising a SLA parameter, identification of the network slice and/or identification of the slice SLA information, and/or the identification of network operational procedures related to the SLA parameter.

Figure 11:
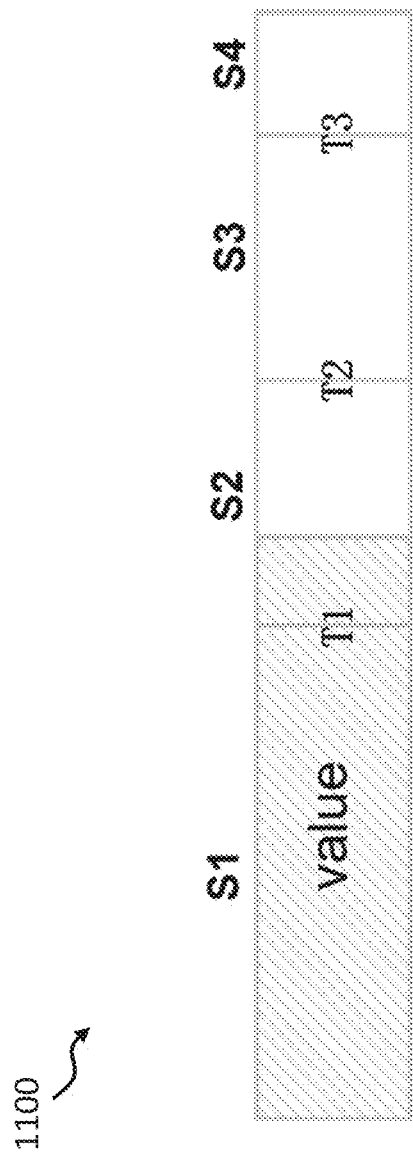
FIG. 11 shows a schematic diagram of an exemplary policy counter with three threshold values and four status levels according to an embodiment.
Figure 17:
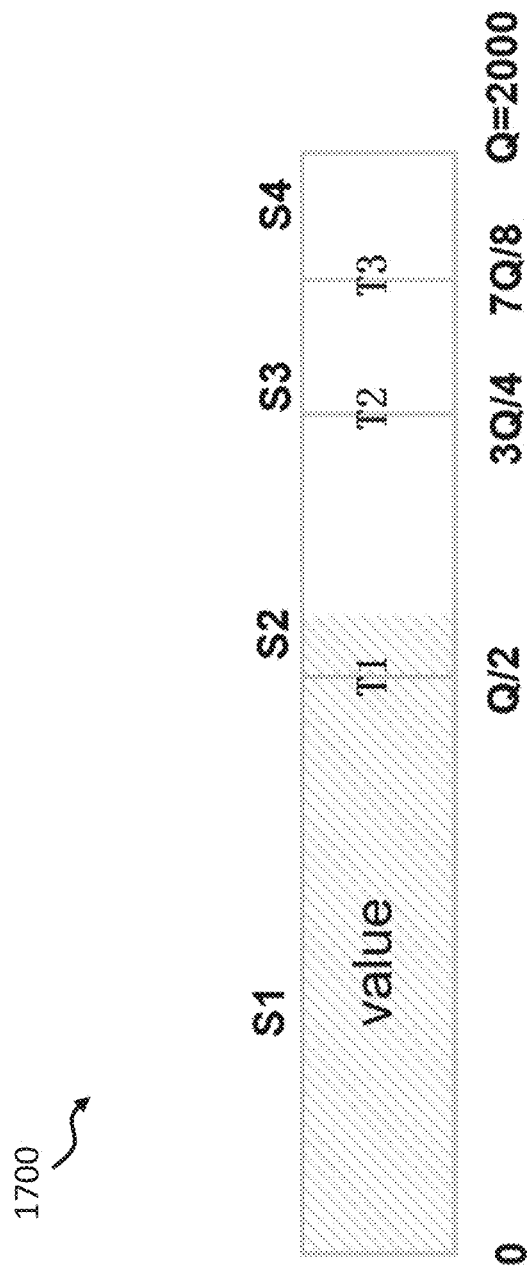
FIG. 17 shows an example of a policy counter with three threshold values and four status levels according to an embodiment.

In an embodiment, the network control entity 211 is further configured to generate a policy counter for monitoring the SLA parameter, wherein the policy counter indicates: the quota comprising information of available communication resources and consumed communication resources. An exemplary policy counter is shown in FIGS. 11 and 17 below.

In an embodiment, the slice SLA indication includes a delegation request of quota enforcement and the network control entity 211 is further configured to obtain from the network entity 201, in response to the delegation request of quota enforcement, the SLA parameter, identification of the network slice and/or identification of the slice SLA information, and/or the identification of network operational procedures related to the SLA parameter, acceptance or rejection indication for the network operational procedures.

In an embodiment, the global or local slice SLA information comprises at least one of: network slice identification; a mapping of subscribers identification to the network slice identification; at least one slice SLA parameter and a corresponding Service Level Objective (SLO); at least one network operational procedure corresponding to the SLA parameter; at least one quota, wherein the quota indicates an upper bound to the network operational procedures; a mapping of at least one network function identification and/or at least one network function set identification to a network slice identification; a mapping of at least one subscriber identification to at least one network operational procedure.

In an embodiment, the network control entity 211 is configured to send the slice SLA information towards the network entity 201 upon reception of the slice SLA indication from the network entity 201, and/or send towards the network entity the slice SLA information regularly and/or periodically upon reception of subscription for the slice SLA information from the network entity 20.

In an embodiment, the network control entity 211 is configured to: send towards a first network function a status of the policy counter within which the amount of communication resources consumed by the first network function is located, and/or receive an update status from the first network function, the update status indicating an updated amount of communication resources consumed by the first network function for performing the first network communication service, wherein the network control entity 211 is configured to modify the policy counter on the basis of the update status received from the first network function.

In an embodiment, the network control entity 211 is configured to send a request to the network entity 201 for increasing the quota, if the update status received from the first network function is above a predetermined threshold, and/or configured to send a request to the network entity 201 for decreasing the quota, if the update status received from the first network function is below a further predetermined threshold.

In an embodiment, the SLA parameter comprises at least one of a maximumnumber of user equipments per network slice, a guaranteed number of user equipments per network slice, a maximum number of packet data unit, PDU, sections per network slice, a guaranteed number of PDU sections per network slice, a maximum downlink throughput per network slice, a guaranteed downlink throughput per network slice, a maximum uplink throughput per network slice, a guaranteed uplink throughput per network slice.

In an embodiment, the network control entity 211 is configured to receive a procedure information from the first network function, the procedure information comprising a request for providing the first network communication service by the first network function, wherein the network control entity 211 is configured to determine an action on the basis of the procedure information and the policy counter, the action comprising: acception of the request, rejection of the request, or indication of re-sending the request, and the network control entity 211 is configured to send a message signalling the action determined by the network control entity towards the first network function.

In an embodiment, the procedure information is associated with a registration procedure and the procedure information comprises a request for registering a user entity to the network slice by the first network function, and/or wherein the procedure information is associated with a section management procedure and the procedure information comprises a request for establishing a section connection between a user entity and the network slice by the first network function.

In an embodiment, the network control entity 211 is further configured to receive a message for updating the policy counter of the at least one SLA parameter from the first network function and to receive an update status from the first network function, the update status indicating an updated amount of communication resources consumed by the first network function for performing the first network communication service. The processor 215 of the network control entity 211 is further configured to modify the policy counter on the basis of the update status received from the first network function.

In an embodiment, the network control entity 211 is configured to send the policy counter that is modified on the basis of the update status towards the first network function.

In an embodiment, the network control entity 211 is configured to receive an amount of communication resources consumed by a second network function for performing a second network communication service, wherein the processor 215 is configured to calculate an amount of remaining available communication resources on the basis of the slice level objective, the updated status received from the first network function and the amount of communication resources consumed by the second network function for performing the second network communication service.

In an embodiment, the network control entity 211 is configured to send a request to the network entity 201 for changing the quota and wherein, if the communication interface receives a new value for the quota, the processor 215 of the network control entity 211 is configured to modify the policy counter on the basis of the new value for the quota.

In an embodiment, the processor 215 of the network control entity 211 is configured to generate an identifier of the network slice for associating the network slice with the at least one SLA parameter and enforcing the at least one SLA parameter at the first network function within the network slice, wherein the identifier comprises at least one of the following: subscriber information of the network slice, in particular subscription permanent identifier and/or a list of subscription permanent identifiers; an identifier of the network slice and information associated with the network slice, in particular, single network slice selection assistance information, S-NSSAI, and/or network slice instance, NSI; and/or association of a combination of S-NSSAI(s) and/or NSI(s).

According to an embodiment, a slice SLA is defined as the slice specific technical requirements of the SLA of a communication service defined above. The Network Slice specific GST attributes include but are not limited to the following attributes: number of terminals per Network Slice (e.g., maximum number of UEs per Network Slice, guaranteed number of UEs per Network Slice); number of connections per Network Slice (e.g., maximum number of PDU sessions per Network Slice, guaranteed number of PDU sessions per Network Slice); downlink (DL) throughput per Network Slice; uplink (UL) throughput per Network Slice; coverage area of the Network Slice; isolation level of the Network Slice; session and service continuity of the Network Slice.

The following embodiments highlight at least the first two GST attributes as slice SLA parameters and how to enforce these GST attributes (i.e. slice SLA parameters). However, the enforcement of the other GST attributes (i.e., slice SLA parameters) including the attributes described above are also covered if applicable. The terms "maximum" or "guaranteed" of GST attributes (or slice SLA parameters) can be considered for the different evaluation period (e.g., 24/7 or a specific period of peak hours or a specific period).

The slice SLA, in particular, can be defined as the network slice specific GST attributes and bounds on the communication services (e.g., NS, NSaaS, CS) which have been agreed between a communication service provider (e.g., an operator) and a communication service customer (e.g., a vertical provider). Based on the slice SLA, the communication service provider (e.g., an operator) would require mechanisms to control and manage the slice SLA fulfilments and assurance, in particular, the slice SLA parameters enforcement mechanisms. In the embodiments of the present disclosure, the terms slice SLA parameters and GST attributes are interchangeable.

The enforcement mechanisms can mainly be done by the 5G System (5GS). The 5GS is composed of 5G RAN and 5G Core (5GC) network. The mechanisms and features of this disclosure are not limited to 3GPP Networks and components, e.g., 5G Radio access network (RAN), Operation Administration and Management (OAM).

In the current 5G architecture defined in 3GPP, there might exist multiple enforcement points at 5GC network functions for different slice SLA parameters. In addition, there might exist multiple instances of each enforcement point (e.g., multiple PCF instances). The enforcement mechanisms for each slice SLA parameter may have impacts on specific 5GC network functions and specific procedures.

The slice SLA of a communication service includes Network Slice specific SLA parameter(s) as described above with a Service Level Objective (SLO), where the actual SLO(s) of Network Slice specific parameter(s) will be driven by the customer (e.g., a vertical) and business expectations for the network slice. In principle, the SLO information should include the details of how the SLO will be measured including the source for the data.

For example, a slice SLA of an eMBB (Enhanced Mobile Broadband) slice as a service may include the following slice SLA parameters with SLOs: maximum number of allowed PDU sessions of 150,000 and maximum number of allowed UEs (user devices) of 50,000. In an embodiment there can be two enforcement points (e.g., PCF #01 and PCF #02) for the specific slice SLA. The associated quota of each slice SLA parameter will be distributed across two enforcement points, i.e., PCF #01 and PCF #02.

More details about features and functionalities of the network entity 201 and the network control entity 211 in the network management system 200 will be further discussed as follows. The network control entity 211 is also hereafter referred to as a "slice SLA policy controller" (SSPC) or as the Entity in the following embodiments, and the network entity 201 is also referred to as "$2^{nd}$ Entity" in the following embodiments.

Figure 3:
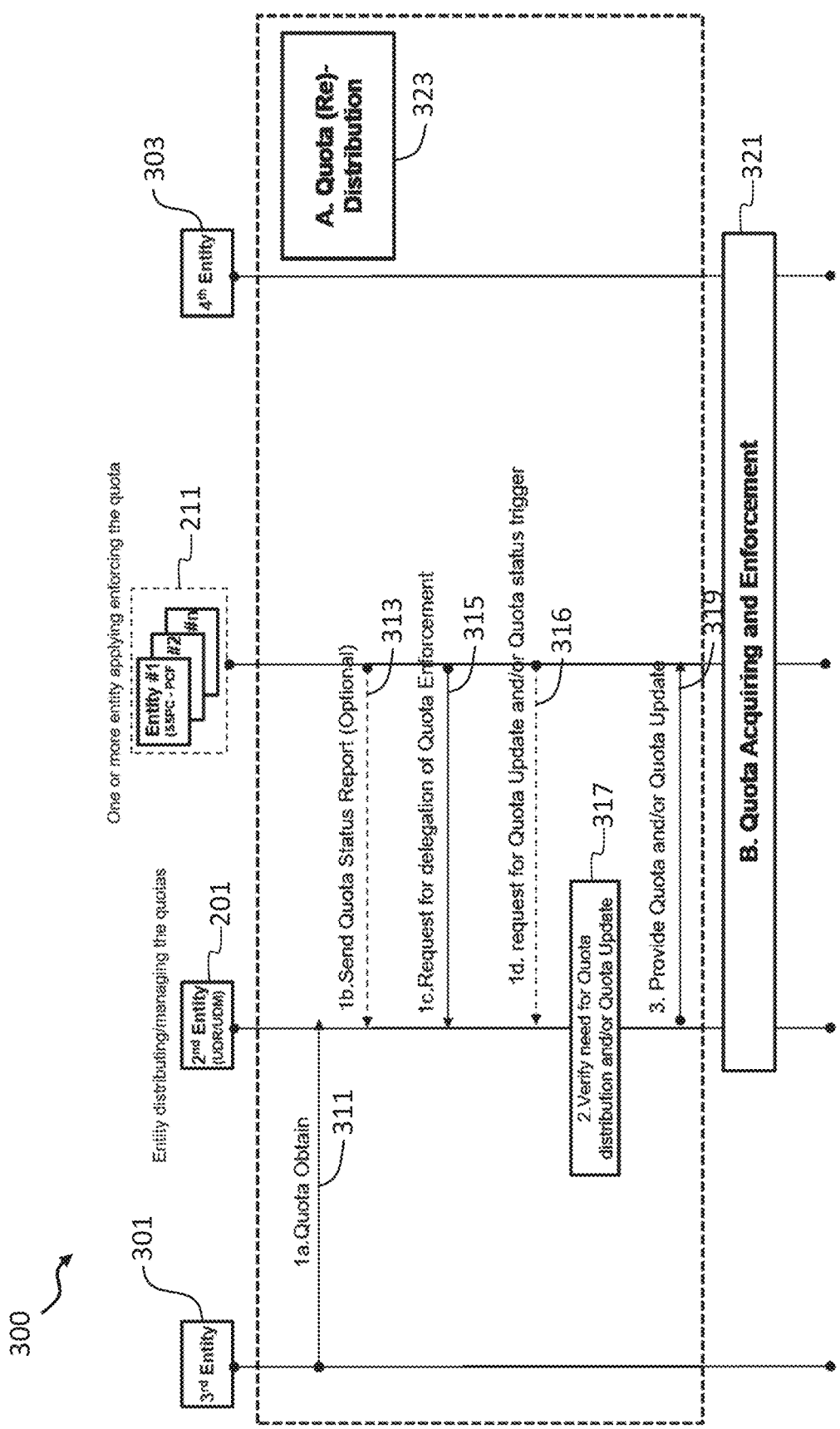
FIG. 3 shows a schematic diagram illustrating a procedure of information exchanging for quota distribution/re-distribution between a network entity and a network control entity according to an embodiment.

FIG. 3 shows a schematic diagram illustrating a procedure 300 of information exchanging for quota distribution/redistribution between the network entity 201 and the network control entity i.e. the SSPC 211 according to an embodiment. This embodiment provides a mechanism for distributed management of slice SLA quotas at the control plane of mobile networks. The key aspects covered by this embodiment are the interactions and information exchanged between an entity 201 distributing/managing the slice SLA quotas (UDR and/or UDM) and one or more entities 211 applying/enforcing the slice SLO quota (i.e. the SSPC). The procedure 300 comprises the following steps:

Step 311:

In this step, the $2^{nd}$ Entity 201 will receive quota related information from a $3^{rd}$ Entity 301. The quota related information from the $3^{rd}$ Entity 301 may include the following information: slice SLA information and network deployment information.

The slice SLA information (i.e., quota related information) includes but is not limited to: network Slice information (S-NSSAI and/or NSI and/or the association of S-NS- SAI(s) and NSI(s)); the subscribers of the network slice information (SUPI or the list of SUPIs for associated network slice); Slice SLA parameters and with Service Level Objective(SLO), in particular, Number of terminals per Network Slice (e.g., Maximum number of allowed UEs per Network Slice, Guaranteed number of UEs per Network Slice), Number of connections per Network Slice (e.g., Maximum number of allowed PDU sessions per Network Slice, Guaranteed number of PDU sessions per Network Slice); The identifier related to the slice SLA parameters of specific Network Slice and/or the association/mapping of Network Slice related information for slice SLA parameters, in particular, at least one of the following information to perform the correct enforcement at a policy control and enforcement function in a network: Subscriber(s) information (e.g., SUPI or a list of SUPIs), Network Slice identifiers and information (e.g., S-NSSAI and/or NSI), and the association of the combination of S-NSSAI(s) and/or NSI(s).

The network deployment information includes but is not limited to: 5GC NFs deployment (e.g., area) related information (including instances of 5GC NFs) and 5GC NFs capability related information (including instances of 5GC NFs).

Step 313 of sending quota status report (which can be optional):

The $2^{nd}$ Entity 201 receives the report/notification of the status of quota from the SSPC 211. (This is equivalent to the Part B, step 2d, FIG. 4).

Figure 4:
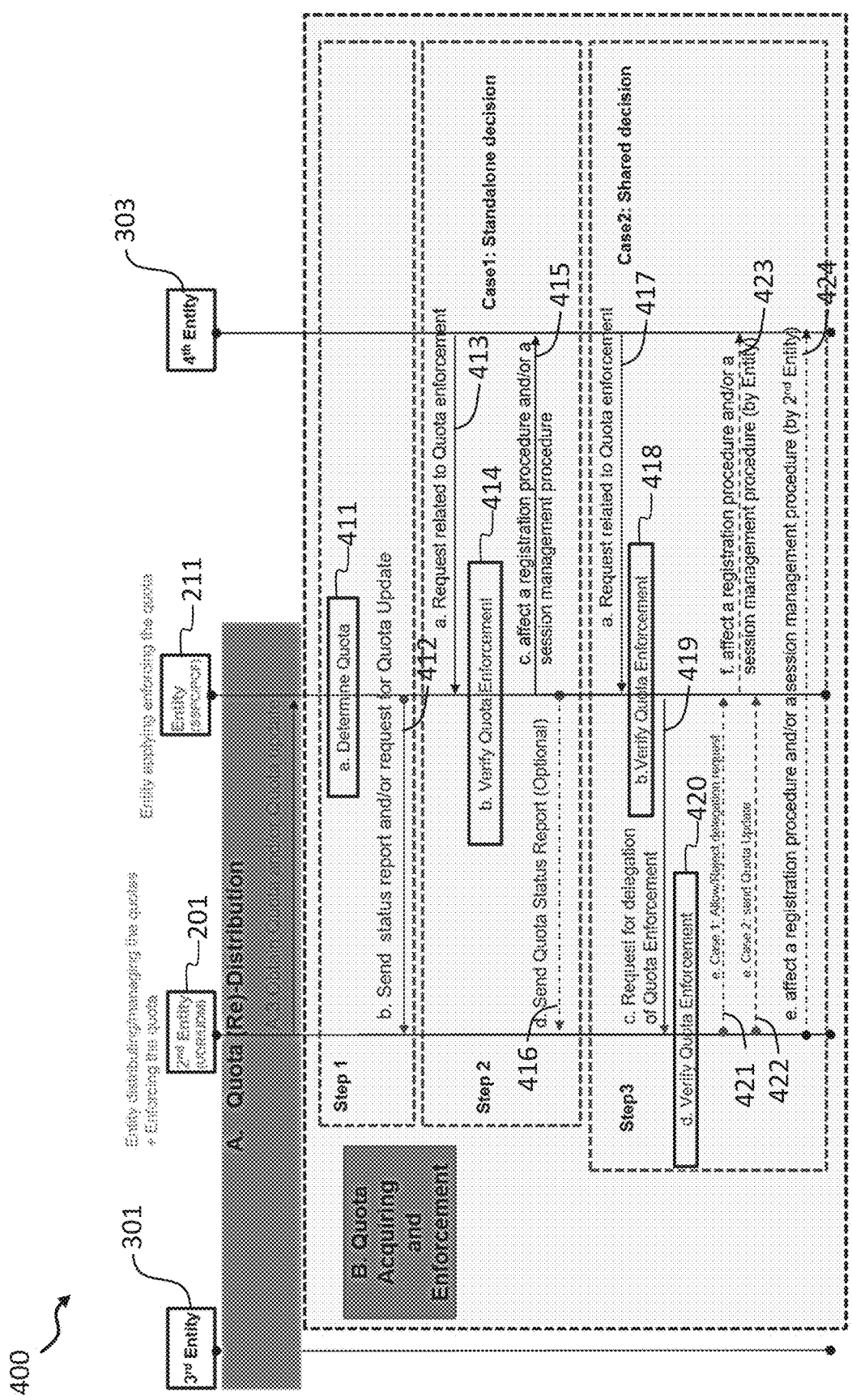
FIG. 4 shows a schematic diagram illustrating a procedure of information exchanging for quota acquisition and enforcement between a network entity and a network control entity according to an embodiment.

Step 315 of request for delegation of quota enforcement:

This is for the case 2: shared decision from Part B, Step 3 (see FIG. 4). When the SSPC 211 consumed all quota, in the case of a the SSPC 211 cannot be determine the quota enforcement locally, based on the request relating to the control plane procedure of SLA related request, the request is delegated to the $2^{nd}$ Entity to perform quota enforcement. It is assumed that the $2^{nd}$ Entity 201 will also maintain the policy counter to manage and control the global quota status.

Step 316 of request for quota update and/or quota status trigger:

This request is triggered by the Entity (i.e. SSPC) 211 in the case of quota update and by the $2^{nd}$ Entity 201 in the case of Quota status trigger.

Step 317 of verifying need for quota distribution and/or quota update:

Based on the received request of new quota update, the $2^{nd}$ Entity 201 will verify the need for quota distribution.

Step 319 of providing quota and/or quota update:

For the first option (i.e., provide quota), the $2^{nd}$ Entity 201 will send the quota itself or quota Information sufficient to calculate the quota. For the second option (i.e., quota update), the $2^{nd}$ Entity 201 will determine the request based on the global quota status and send the response to the entity 211. The request can be granted or rejected. This is a response to the first option (i.e., request for quota Update) of step 316.

Step 321:

This step is related to quota acquiring and enforcement which will be discussed in FIG. 4.

FIG. 4 shows a schematic diagram illustrating a procedure 400 of information exchanging for quota acquisition and enforcement between the network entity 201 and the network control entity i.e. the SSPC 211 according to an embodiment. The procedure 400 comprises the following steps:

Step 1:
(a) Upon obtaining quota from step 319, FIG. 3, if the quota Information is received, the Entity 211 will determine the quota (step 411).
(b) The Entity 211 will send the status report of the local quota to the $2^{nd}$ Entity 201 to keep track of the global status of the SLA parameter. Optionally, the Entity 211 will send the request for quota update (step 412).

Step 2 of standalone decision by the Entity 211:
(a) The Entity 211 receives a request from a $4^{th}$ entity 303 to provide the decision for the quota enforcement (step 413). The request is also indicated as procedure information.
(b) The Entity 211 verifies the quota status and decides if the request can be accepted (step 414).
(c) The procedure that triggered step2.a continues affected by the decision of the Entity 211 sending message c (step 415).
(d) The Entity 211 may optionally send a quota status report to the $2^{nd}$ Entity 201 (step 416).

Step 3 of shared decision by the Entity 211 and $2^{nd}$ Entity 201:
(a) The Entity 211 receives a request which requires the decision for the quota enforcement (step 417).
(b) The Entity 211 verifies the quota status and decides if the request can be accepted (step 418).
(c) If the decision is not to accept the request, the Entity 211 delegates the decision to the $2^{nd}$ Entity 201. (step 419).
(d) As step 414, but the $2^{nd}$ Entity 201 verifies the quota enforcement taking into account of the status of global quota that takes into account the status of local quota of other Entities (step 420).

After step 420, two options are possible:
First option:
(e) Case 1: The $2^{nd}$ Entity 201 sends the decision to the Entity 211, i.e. Allow/Reject Delegation Request (step 421).
(f) As step 415 (step 423).
Second Option:
(e) The procedure that triggered step3.a continues affected by the decision of the $2^{nd}$ Entity 201 sending message e. (step 424).
(e) Case 2: the $2^{nd}$ Entity may send local quota update to the Entity (step 422).

According to an embodiment, the network control entity 211 is an enabler for slice SLA information in the 5G core network (5GC) to configure slice SLA Policy for slice SLA parameters.

Figure 5:
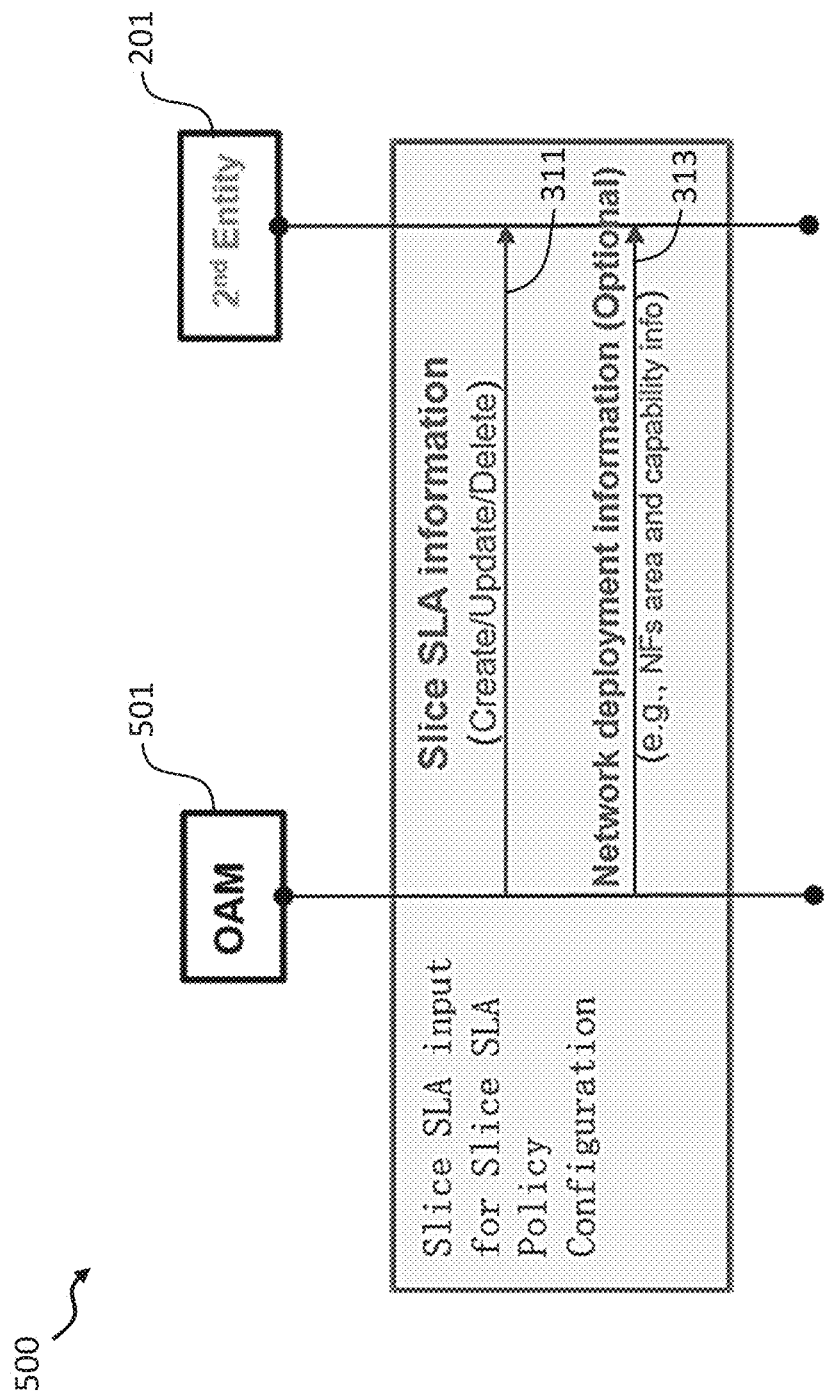
FIG. 5 shows a schematic diagram illustrating an exemplary procedure for slice SLA configuration according to an embodiment.

FIG. 5 shows a schematic diagram illustrating an exemplary procedure 500 for slice SLA configuration and network deployment information according to an embodiment, wherein the procedure 500 comprises the following steps:

First, the network entity 201 is configured to receive slice SLA information from a network entity of operation administration and maintenance, OAM 501 (step 511).

In addition, the network entity 201 is configured to receive network deployment information from the OAM 501 (step 513).

Figure 6:
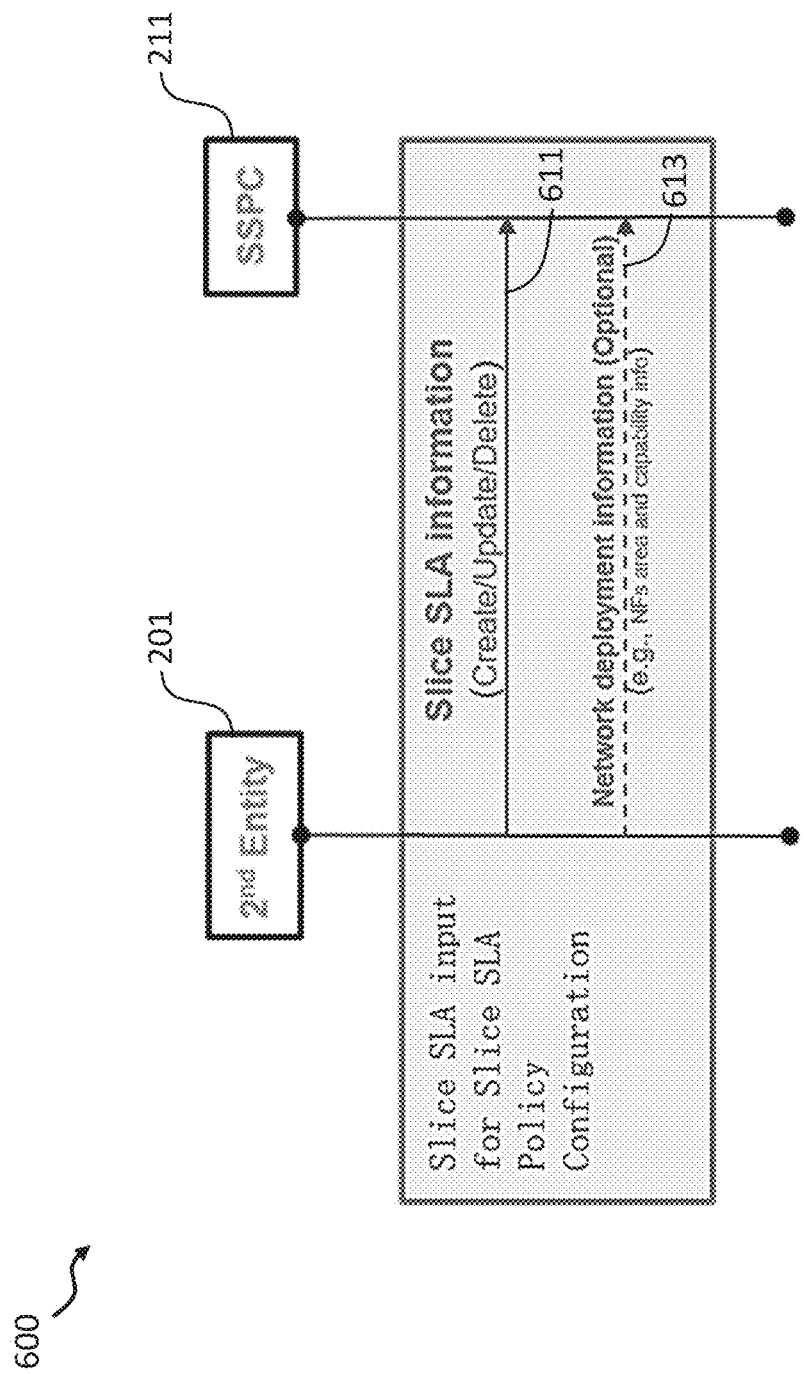
FIG. 6 shows a schematic diagram illustrating an exemplary procedure for slice SLA configuration according to an embodiment.

FIG. 6 shows a schematic diagram illustrating an exemplary procedure 600 for slice SLA configuration and network deployment information according to an embodiment, wherein the procedure 600 comprises the following steps:

First, the SSPC 211 is configured to receive slice SLA information from the network entity 201 (step 611).

In addition, the SSPC 211 is configured to receive network deployment information from the network entity 201 (step 613).

The SSPC 211 or the network entity 201 supports SSPC services that can be used by the OAM 501 to configure and associate Slice SLA policy for the at least above-mentioned slice SLA parameters. The use of the services is one alternative for $2^{nd}$ entity 201 to obtain the Slice SLA policy. Another alternative is that OAM 501 configures the Slice SLA policy at the $2^{nd}$ entity 201. The SSPC services comprise the following: SliceSLAPolicyAssociation_Create; SliceSLAPolicyAssociation_Update; and SliceSLAPolicyAssociation_Delete.

In addition, the SSPC 211 and/or the network entity 201 supports network deployment related services to the OAM 501 to configure and associate network deployment related information to provide configuration of the slice SLA policy, wherein the network deployment related services comprise: NetworkDeploymentInfo_Create and networkDeploymentInfo_Update.

The details of the above services have been described in the following:

SliceSLAPolicyAssociation_Create: the SSPC 211 and/or the network entity 201 exposes a service to create slice SLA policy association and by providing relevant slice SLA parameters (e.g., a maximum number of UEs per Network Slice) with an SLO to associate the policy.

SliceSLAPolicyAssociation_Update: the SSPC 211 and/or the network entity 201 exposes a service to update slice SLA policy association and by providing updated slice SLA parameters information.

SliceSLAPolicyAssociation_Delete: the SSPC 211 and/or the network entity 201 exposes a service to delete slice SLA policy association and by providing updated slice SLA parameters information.

NetworkDeploymentInfo_Create: the SSPC 211 and/or the network entity 201 exposes a service to create Network deployment information, e.g., NF area and capability information for Slice SLA policy association.

NetworkDeploymentInfo_Update: the SSPC 211 and/or the network entity 201 exposes a service to update Network deployment information, e.g., the updated of NF area and capability information for Slice SLA policy association.

Figure 7:
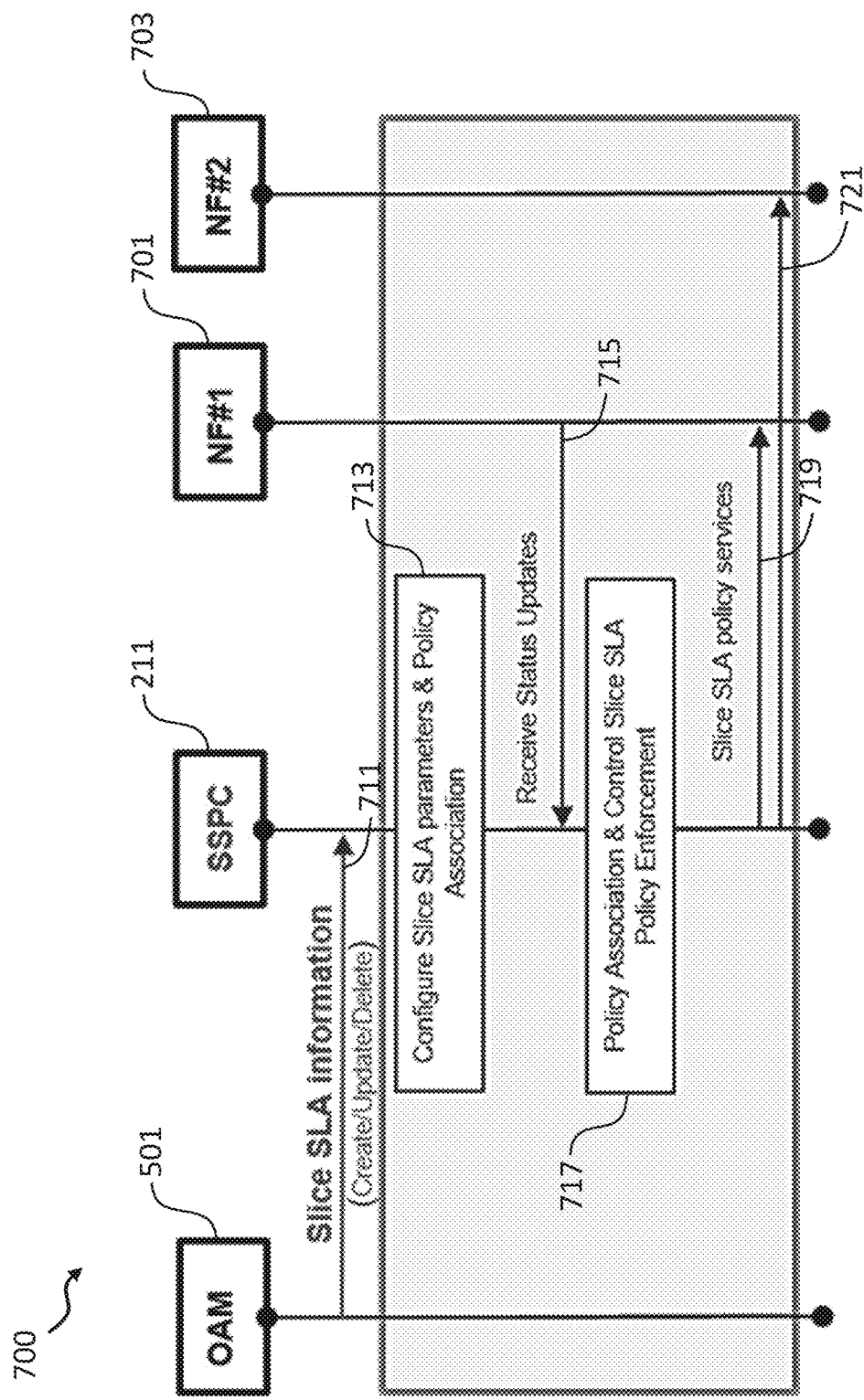
FIG. 7 shows a schematic diagram illustrating an exemplary procedure for configuration of slice SLA data according to an embodiment.

FIG. 7 shows a schematic diagram illustrating an exemplary procedure 700 for configuration of slice SLA data according to an embodiment, wherein the SSPC 211 is configured to perform configuration of slice SLA data and slice SLA policy data structure. The procedure 700 comprises the following steps:

First, the network control entity 211 (also referred to as a slice SLA policy controller, SSPC) is configured to receive slice SLA information from a network entity of operation administration and maintenance (OAM) 501 (step 711).

Upon receiving of the slice SLA information related to slice SLA parameters and associated values, e.g. Service Level Objectives (SLOs), the SSPC 211 is configured to store slice SLA data and information by means of New Data Set Identifier and Data (Sub) Keys (step 713).

Thirdly, the SSPC 211 is configured to receive status updates from a network function 701 and a further network function 703 (step 715). In addition, the SSPC identifies slice SLA policy data structure for slice SLA policy enforcement (step 717).

Finally, the SSPC 211 is configured to provide slice SLA policy services to the network function 701 and the further network function 703 (step 719, 721).

Figure 8:
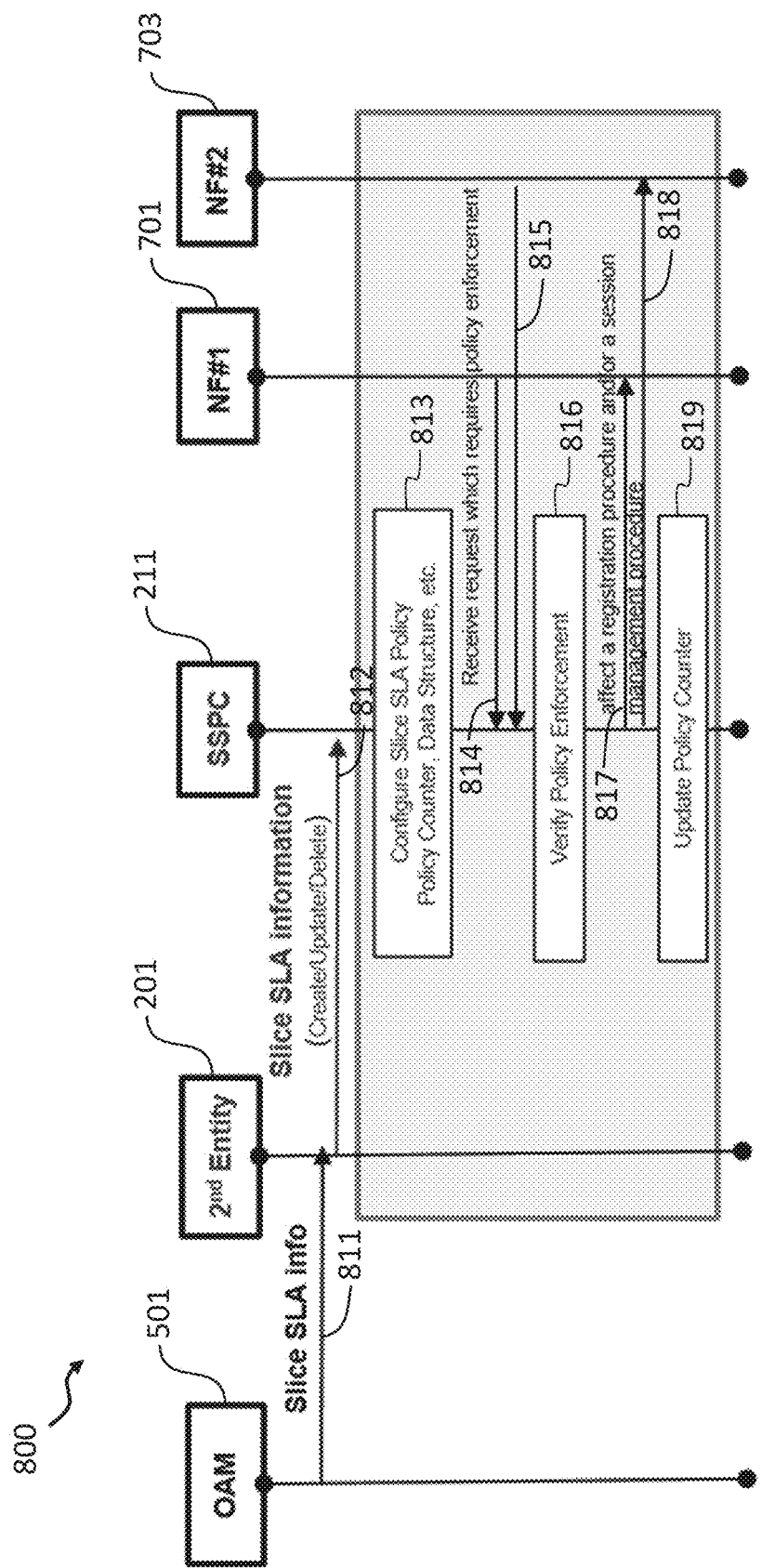
FIG. 8 shows a schematic diagram illustrating an exemplary procedure for configuration of slice SLA data according to an embodiment.

FIG. 8 shows a schematic diagram illustrating an exemplary procedure 800 for configuration of slice SLA data according to an embodiment. The procedure 800 comprises the following steps:

First, the 2nd Entity 201 is configured to receive slice SLA information from a network entity of operation administration and maintenance (OAM) 501 (step 811).

Secondly, the network control entity 211 (also referred to as a slice SLA policy controller, SSPC) is configured to receive slice SLA information from the 2nd Entity 201 (step 812).

In an embodiment, upon receiving of the slice SLA information related to slice SLA parameters and associated values, e.g. Service Level Objectives (SLOs), the SSPC 211 is configured to store slice SLA data and information by means of New Data Set Identifier and Data (Sub) Keys (step 813).

In a further embodiment, upon receiving of Slice SLA information related to Slice SLA parameters and associated values, so called, the Service Level Objectives (SLO), the $2^{nd}$ Entity 201 is configured to store Slice SLA Data and information by means of New Data Set Identifier and Data (Sub) Keys to manage, e.g., the distribution of the quota management.

Further, the SSPC 211 is configured to receive status updates from a network function 701 and a further network function 703 (step 814, 815). In addition, the SSPC 211 identifies slice SLA policy data structure for slice SLA policy enforcement (step 816).

Finally, the SSPC 211 is configured to provide slice SLA policy services to the network function 701 and the further network function 703 (step 817, 818), and to update the policy counter (step 819).

Figure 9:
FIG. 9 shows a schematic diagram of a table of an exemplary data set for slice SLA data according to an embodiment.

FIG. 9 shows a schematic diagram of a table of an exemplary data set 900 for slice SLA data according to an embodiment. The slice SLA data in the data set 900 comprises: a maximum number of UEs per network slice, a maximum number of PDU sessions per network slice, a remaining number of UEs per network slice and a remaining number of PDU sessions per network slice.

In addition, the SSPC 211 identifies Slice SLA policy data structure for Slice SLA policy enforcement. There are at least two embodiments:

In an embodiment regarding one SSPC instance 211 for enforcement point for a Network Slice (e.g., S-NSSAI), a centralized SSPC 211 is aware of the remaining budget of Slice SLA parameters in coordination with the $2^{nd}$ Entity 201.

In a further embodiment regarding multiple SSPC instance with multi-enforcement points for a Network Slice (e.g., S-NSSAI), the SSPC instances 211 perform quota enforcement locally according to the allocated quota and interact to the $2^{nd}$ Entity 201 to synchronize the status of Slice SLA parameters and adjustment or renegotiation of the quota, and/or an SSPC instance 211 delegate quota enforcement to the $2^{nd}$ Entity 201 when the allocated quota has been consumed.

FIG. 10 shows a schematic diagram of a table 1000 of slice SLA policy data structure according to an embodiment. The slice SLA policy data structure in the table 1000 comprises: S-NSSAI information, slice SLA parameters, slice SLA parameter type, slice SLA parameter objectives, slice SLA parameter status, information of network function, a list of network functions and statuses of network functions.

In a further embodiment, the network control entity 211, i.e. the slice SLA policy controller (SSPC) is configured to configure a policy counter and/or update policy counter status. The policy counter is defined to track the status of a slice SLA parameter with respect to the associated quota. In general, the policy counter may comprise different levels of threshold associated with different status of slice SLA parameter. The threshold values are used to identify the status of consumed quota of specific Slice SLA parameter.

An example of a policy counter 1100 with three threshold values and four status levels is shown in FIG. 11. According to the embodiment, the policy counter 1100 has three thresholds T1, T2 and T3 with four status S1, S2, S3 and S4, as shown in FIG. 11. The current local value of the slice SLA parameter is within the thresholds T1 and T2 with the current status to be reported is S2.

Figure 12:
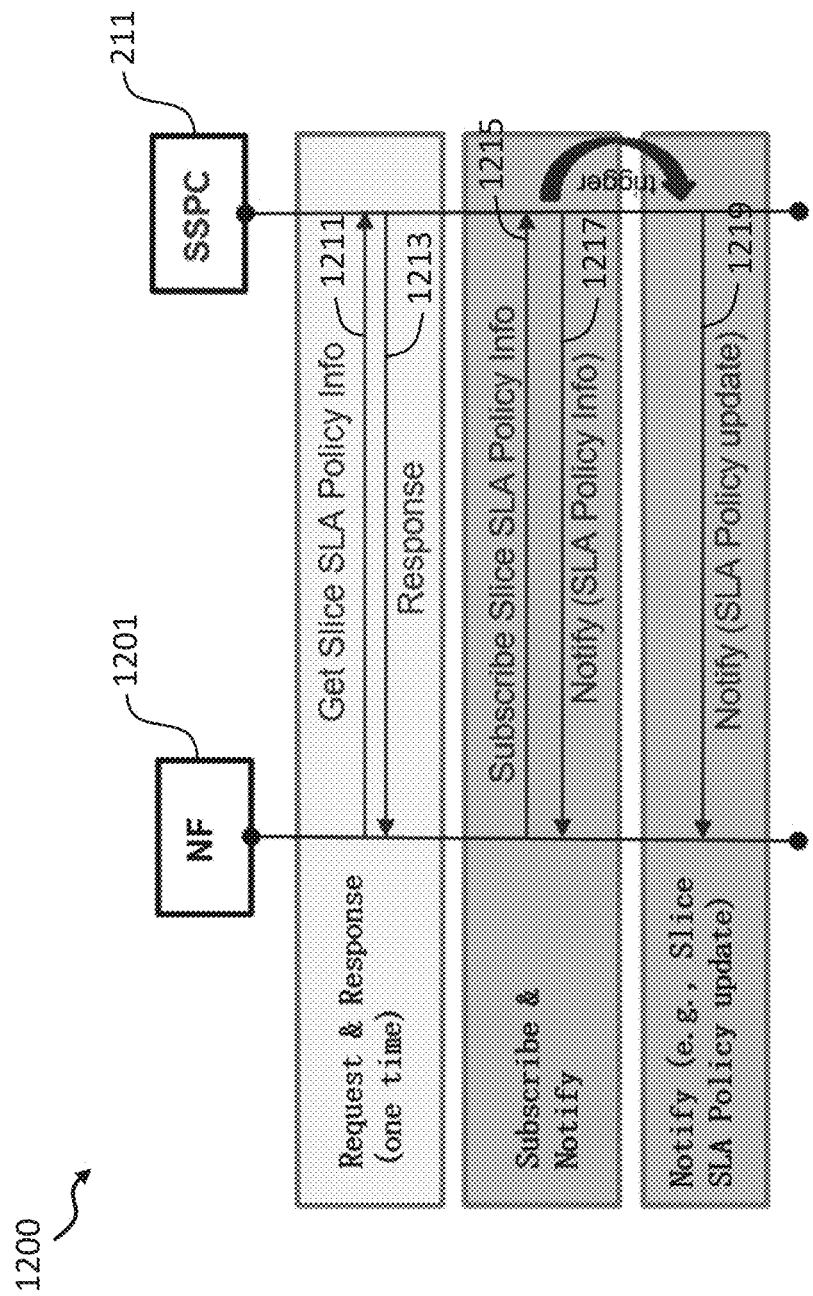
FIG. 12 shows a schematic diagram illustrating an exemplary procedure for control of slice SLA policy enforcement according to an embodiment.

FIG. 12 shows a schematic diagram illustrating an exemplary procedure 1200 for control of slice SLA policy enforcement according to an embodiment, wherein the SSPC 211 is configured to perform slice SLA policy enforcement procedures. In this embodiment, the slice SLA policy and/or status updates by the SSPC 211 are performed between the SSPC 211 and a network function (NF) 1201. The trigger is done by the SSPC 211 to the NF 1201. There is no interaction between the NF 1201 to update the global status of Slice SLA parameters.

The procedure 1200 comprises the following steps:

The network function 1201 sends a request for the SLA information to the SSPC 211 (step 1211).

The SSPC 211 is configured to send the SLA information towards the network function upon 1201 reception of the request (step 1213).

The network function 1201 sends a subscription request for the SLA information to the SSPC 211 (step 1215).

The SSPC 211 is configured to send towards the network function 1201 the SLA information regularly and/or periodically upon reception of the subscription (step 1217).

Further, the SSPC 211 is configured to notify the network function 1201 about the updates of the SLA policy regularly and/or periodically (step 1219).

Figure 13:
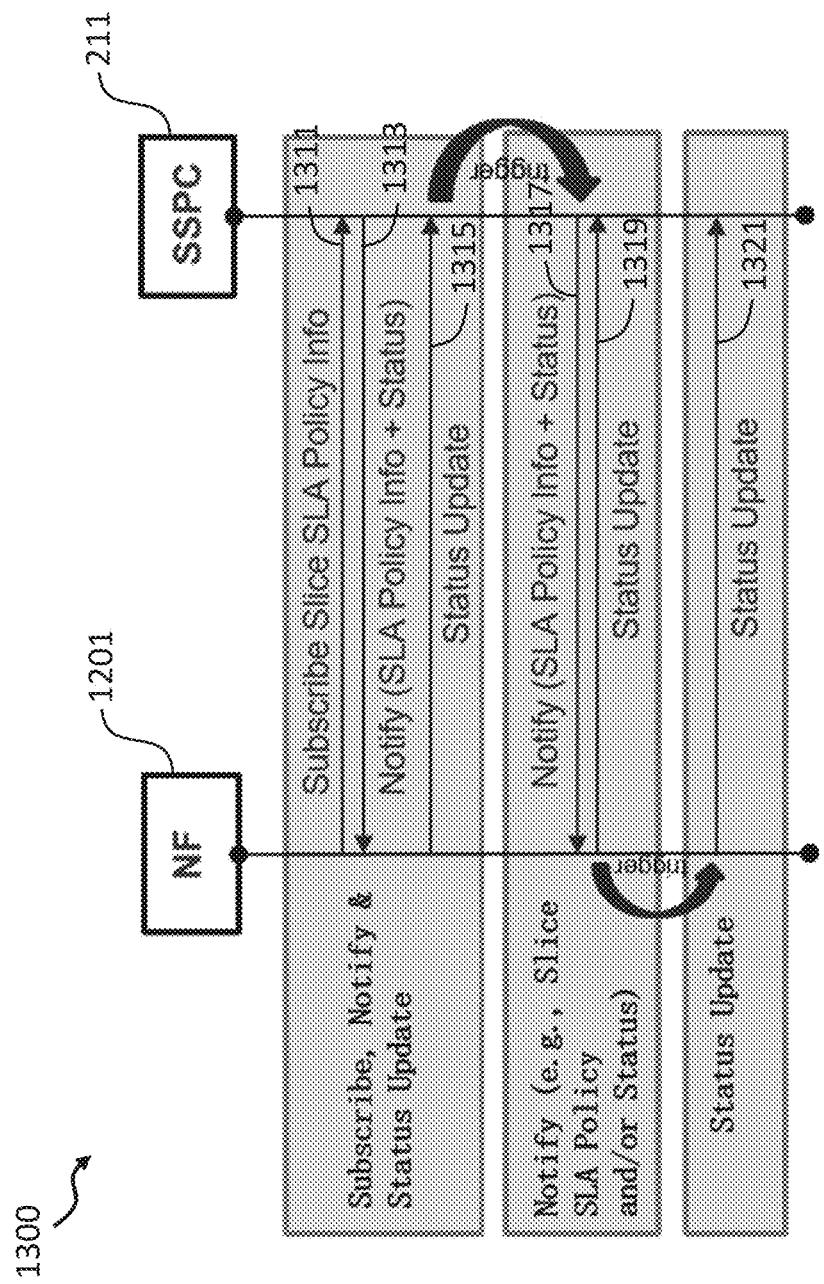
FIG. 13 shows a schematic diagram illustrating a further exemplary procedure for control of slice SLA policy enforcement according to an embodiment.

FIG. 13 shows a schematic diagram illustrating a further exemplary procedure 1300 for control of slice SLA policy enforcement according to an embodiment, wherein the SSPC 211 is configured to perform slice SLA policy enforcement procedures.

The procedure 1300 comprises the following steps:

The network function 1201 sends a subscription request for the SLA information to the SSPC 211 (step 1311).

The SSPC 211 is configured to send towards the network function 1201 the SLA information upon reception of the subscription together with status of the corresponding slice SLA parameter (step 1313).

The network function 1201 sends status updates to the SSPC 211 (step 1315).

The SSPC 211 is configured to notify the network function 1201 about the SLA information together with status of the corresponding slice SLA parameter (step 1317).

The network function 1201 sends status updates to the SSPC 211 (step 1319).

The network function 1201 may also trigger the status updates to the SSPC 211 based on event or periodically (step 1321).

In an embodiment regarding slice SLA quota distribution between the network control entity (i.e. the Entity) 211 and the network entity 201 (i.e. $2^{nd}$ Entity), there exist multiple enforcement points, e_i, where i=1 . . . N, and N is the number of enforcement points. $Quota_i$ is assumed to be the quota allocated to an enforcement point, e_i. and SLO be the allowed/agreed value of a slice SLA parameter. For example, the SLO is the network Slice related maximum allowed number of UEs (or) maximum allowed number of PDU sessions.

Additionally, $Status_i$ is defined as the current value of the number of UEs or PDU sessions for specific Network Slice which are handling on the enforcement point, e_j.

Basically, the SLO of a specific slice SLA parameter, i.e., the value of a specific slice SLA parameter is assumed to be distributed across multiple enforcement points where in each enforcement point gets a quota but there is also a quota left which can be shared across all enforcement points later in time, e.g., if an enforcement point would require more quota due to its allocated quota has been consumed.

Based on the above assumptions, a model can be defined for the quota distribution across multiple enforcement points as follow.

For each e_i, i=1, . . . , N $$\sum_{i=1}^{N} Quota_i \leq SLO$$

$$SLO - \sum_{i=1}^{N} Quota_i \geq 0$$

If $Status_j \geq Quota_j$, for $j \in (1, \ldots, N)$, $Quota_j = Quota_j + \partial^*[SLO - \Sigma_{i=1}^{N} Quota_i]$, where $i \neq j$.

The value of a can be determined based on Operator configuration or equal distribution of the remaining quota.

Figure 14:
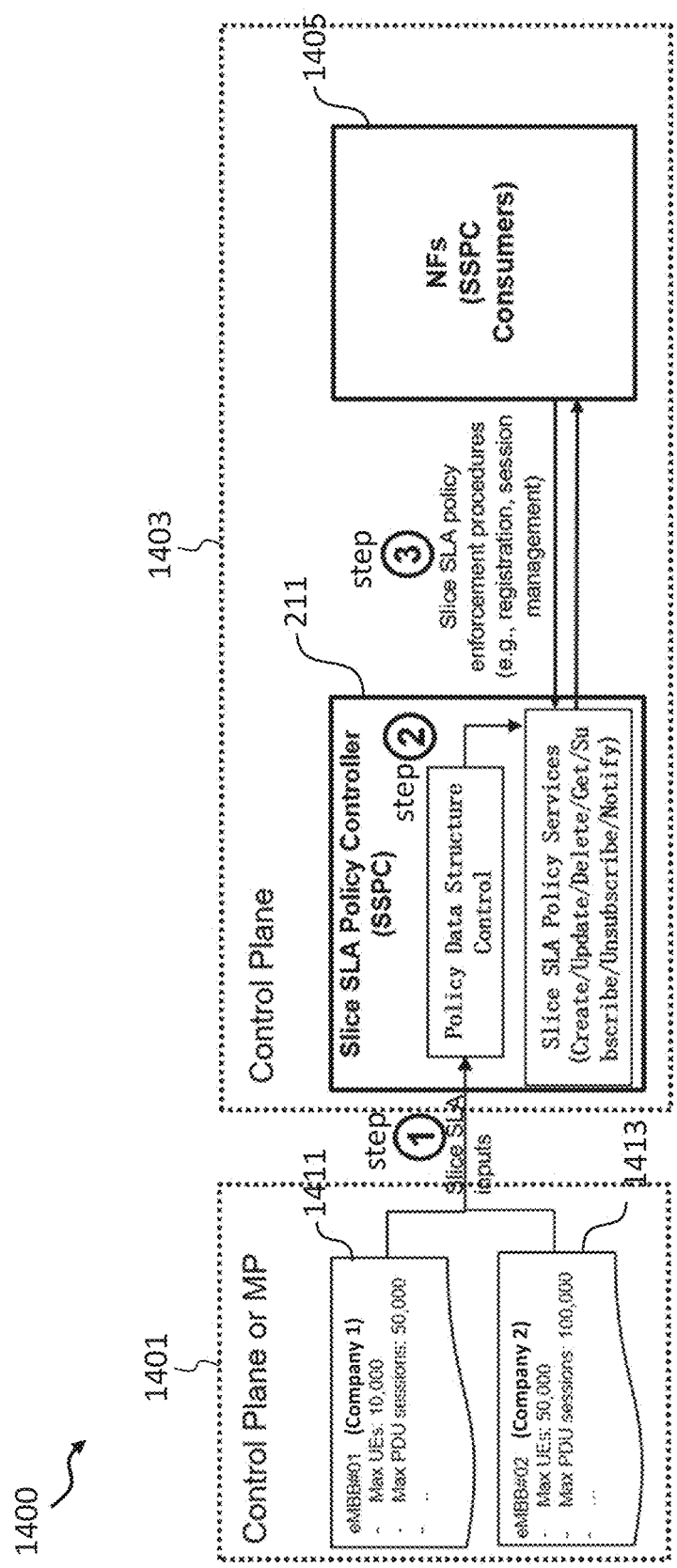
FIG. 14 shows a schematic diagram illustrating the architecture of a communication network with a control plane or management plane and a further control plane according to an embodiment.

Embodiments of the present disclosure can be implemented in a communication network 1400, which has a general architecture as shown in FIG. 14. The communication network 1400 comprises a control plane or a management plane 1401 and a further control plane 1403.

The control plane or the management plane 1401 is configured to support the network slices 1411, 1413 which can provide communication services according to different slice SLA policies for different companies.

The network control entity 211 (i.e. the SSPC) and/or the network entity 201 (i.e., the $2^{nd}$ Entity) for managing one or more slice SLA policies is implemented to operate in the further control plane 1403 of the communication network 1400 and can communicate via the further control plane 1403 with different network functions 1405.

Functionalities of the slice SLA policy controller (SSPC) 211 and/or the network entity 201 (i.e., the $2^{nd}$ Entity) upon reception of slice SLA information inputs for step 1 as seen in FIG. 14 are listed as follows:

SliceSLAPolicyAssociation_Create: the SSPC 211 and/or the network entity 201 is configured to expose a service to create Slice SLA policy Association to the consumers and by providing relevant Slice SLA Parameters (e.g., maximum number of UEs per Network Slice) with a SLO to associate the policy, wherein the SSPC 211 and/or the network entity 201 can input S-NSSAI, Slice SLA Parameters, SLOs of Slice SLA Parameters and can output Slice SLA Policy Association ID.

SliceSLAPolicyAssociation_Update: the SSPC 211 and/or the network entity 201 is configured to expose a service to update Slice SLA policy Association to the consumers and by providing updated Slice SLA parameters information, wherein the SSPC 211 and/or the network entity 201 can input Slice SLA Policy Association ID, Slice SLA Parameter, SLOs of Slice SLA Parameters and can output a response indicating success or not.

SliceSLAPolicyAssociation_Delete: the SSPC 211 and/or the network entity 201 is configured to expose a service to delete Slice SLA policy Association to the consumers and by providing updated Slice SLA parameters information, wherein the SSPC 211 and/or the network entity 201 can input Slice SLA Policy Association ID and can output a response indicating success or not.

Functionalities of the slice SLA policy controller (SSPC) 211 and/or the network entity 201 associated with slice SLA policy enforcement procedures (step 3 as seen in FIG. 14) are listed as follows:

SliceSLAPolicy_Get: the SSPC 211 and/or the network entity 201 is configured to expose a service to a network function (NF, i.e. a consumer) to get the Slice SLA policy, e.g., related to registration or session management procedures, wherein the SSPC 211 and/or the network entity 201 can input S-NSSAI, NF-ID, Target address and/or Slice SLA Parameter(s) (Optional) and can output Slice SLA policy Association.

SliceSLAPolicy_Subscribe: the SSPC 211 and/or the network entity 201 is configured to expose a service to a NF, a consumer, to subscribe receiving the Slice SLA policy and updates, e.g., related to registration or session management procedures, wherein the SSPC 211 can input S-NSSAI, NF-ID, target of subscription, slice SLA parameter(s) (optional), reporting information and can output Slice SLA Policy Subscription Correlation ID.

SliceSLAPolicy_Unsubscribe: the SSPC 211 and/or the network entity 201 is configured to expose a service to a NF, a consumer, to unsubscribe receiving the Slice SLA policy and updates, e.g., related to registration or session management procedures, wherein the SSPC 211 and/or the network entity 201 can input Slice SLA Policy Subscription Correlation ID and can output a response indicating success or not.

SliceSLAPolicy Notify: the SSPC 211 and/or the network entity 201 is configured to notify the subscribed NF, a consumer, the Slice SLA policy and/or updates e.g., related to registration or session management procedures, wherein the SSPC 211 and/or the network entity 201 can input Slice SLA Policy Subscription Correlation ID
  Notification Correlation Information time stamp.

Furthermore, a network function (i.e. a consumer) can request the association of Slice SLA policy status updates, e.g., related to registration or session management procedures from the SSPC 211 and/or the network entity 201 by a service "SliceSLAPolicyAssociation_Update",
  wherein associated inputs comprise: Slice SLA Policy Subscription, Correlation ID, Association Update Information and an associated output can be a response indicating success or not.

Figure 15:
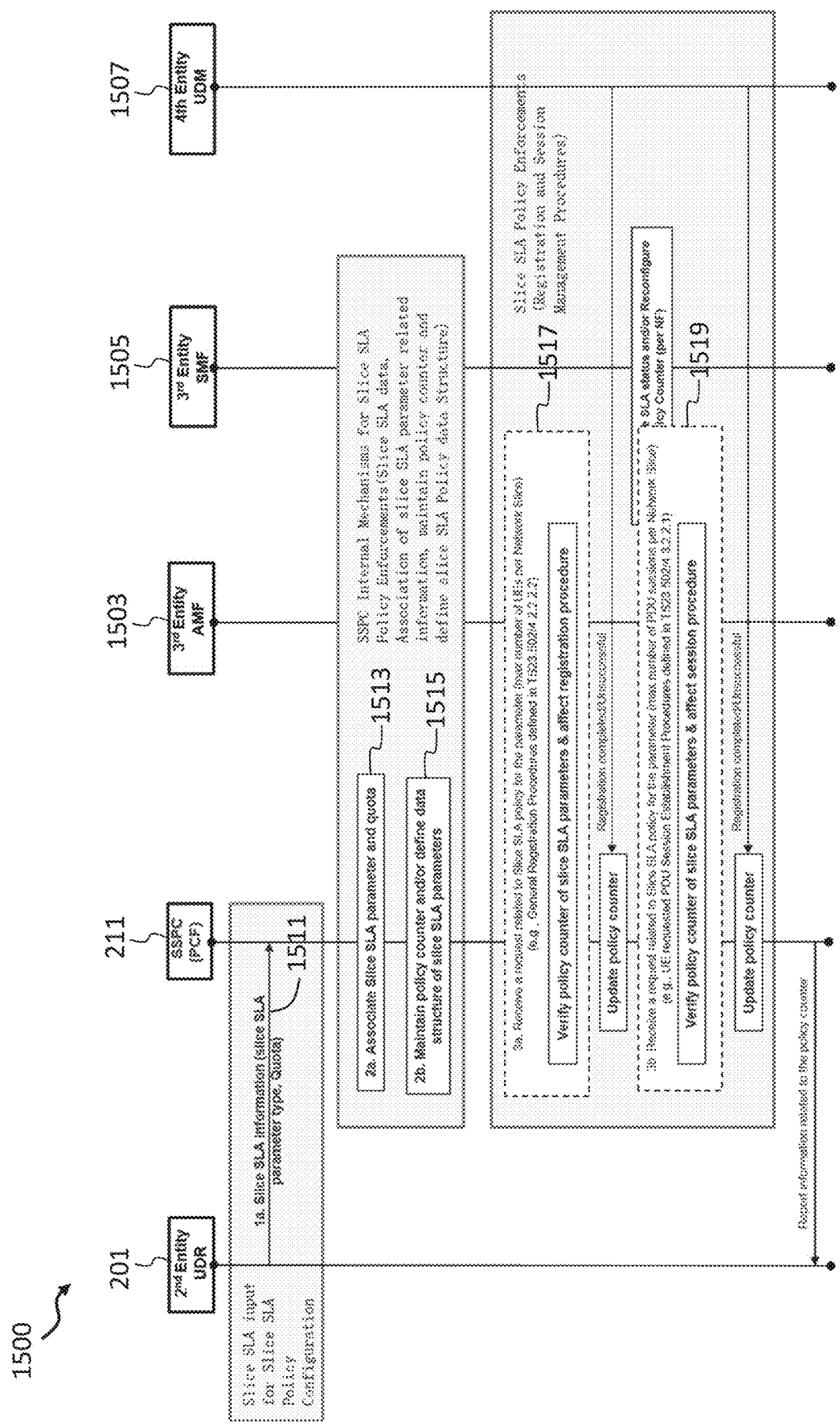
FIG. 15 shows a schematic diagram illustrating a procedure for slice SLA policy enforcement according to an embodiment.

FIG. 15 shows a schematic diagram illustrating a procedure 1500 for slice SLA policy enforcement according to an embodiment, wherein this embodiment is based on the 5GC network functions, in particular the policy control function (PCF) and unified data repository (UDR) and the related system procedures are a registration procedure and a session management Procedure. In particular, a slice SLA policy for the specific GST attributes, a maximum number of UEs per Network Slice, is enforced at a registration procedure by the Access and Mobility Management Function (AMF) and a maximum number of PDU sessions per Network Slice, is enforced at Session Management procedure by Session Management Function (SMF).

FIG. 15 shows an embodiment of the SSPC 211 with impacted 5GC network functions and procedures of slice SLA policy enforcement mechanisms. The procedure 1500 comprises the following steps:

Step 1511:
  the network control entity 211 (i.e. the SSPC) can be a 5GC network function, e.g. PCF and is configured to receive slice SLA related information from a UDM/UDR 201. The slice SLA related information comprise at least a slice SLA parameter and the associated quota. The quota can be varied from 0 to 100% of the SLO of the associated slice SLA parameter. In addition, the PCF may also receive other related information of specific Network Slice(s) in which the slice SLA parameter(s) are characterized to and/or network deployment information including the associated NFs of the specific Network Slice of the specific slice SLA parameters.

For instance, the value of a SLO of a slice SLA parameter, the maximum number of UEs per Network Slice is 10000. If the quota is 20% of the SLO of a specific slice SLA parameter, the value of the quota will be represented as 2000.

In order to provide this information, the UDM/UDR 201 maintains slice SLA related information by means of New Data Set Identifier and Data (Sub) Keys. An exemplary data set of slice SLA data identified by the UDM/UDR 201 can be seen in FIG. 9.

Step 1513:
  If a PCF instance receives slice SLA information (e.g., the quota of a specific slice SLA parameter and/or type), the information may be associated for the specific Network Slice if Network Slice related information has been received. This association information might be needed to control and selectively enable the slice SLA policy enforcement for the quota only for Network Slices that require it.

Step 1515:
  If a PCF instance received the quota of specific slice SLA parameter of associated network slice from UDM/UDR, the PCF instance identifies and configures a policy counter for the associated slice SLA parameter of associated Network Slice(s). A policy counter is maintained with four elements: quota; threshold(s); status of the policy counter and a local value of slice SLA parameter type.

FIG. 17 shows an example of a policy counter 1700 with three threshold values and four status levels according to an embodiment. In the policy counter, the receive quota from step 1511 is used to define the maximum value. In general, the policy counter may comprise different threshold levels associated with different statuses of the slice SLA parameter. The threshold values are used to identify the status of a consumed quota of a specific Slice SLA parameter. The threshold values are identified with respect to the quota, e.g. a quota can be 2,000. A threshold is used to define an internal control mechanism and/or a mechanism related to the reporting and/or the status of the local value of a slice SLA parameter type. The value of the policy counter starts from 0. For example, if the value of policy counter crosses the thresholds T1 and T3, based on an operator policy, the information associated with the policy counter can be reported. The status of policy counter is defined by the threshold and the local value of the slice SLA parameter type.

As can be seen from FIG. 17, the policy counter comprises three threshold values and four status levels. The current local value of a slice SLA parameter is within the thresholds T1 and T2, and the current status to be reported is S2.

In a further embodiment, the PCF may configure slice SLA policy data structure to associate the Network Slice related information with respect to the slice SLA parameters.

Step 1517:
  Slice SLA policy control and enforcement can be done in system procedures. In particular, a specific slice SLA parameter, maximum number of UEs per Network Slice, can be controlled and enforced at registration management procedure. In particular, when a UE requests a registration, in coordination with the associated AMF and PCF, the PCF can monitor the status of the locally allowed quota of number of UEs for the specific Network Slice and the enforcement can be done based on the status of locally allowed quota of UEs for the specific Network Slice. The enforcement of maximum number of UEs per Network Slice can be done at "general registration procedures" as defined in the clause 4.2.2.2.2 in the 3GPP specification TS 23.502 v16.2.0. The registration procedure can be specifically performed with the policy enforcement procedure for the slice SLA parameter, maximum number of UEs per Network Slice.

Basically, upon receiving a registration request from a UE, an AMF 1503 interacts with the PCF for AM policy association establishment/modification. Using the existing procedure between AMF and PCF, when a PCF receives such a request or a related request from AMF, PCF verifies the policy counter of a slice SLA parameter type, number of UEs per Network Slice for a specific Network Slice information, e.g., S-NSSAI information received. If the local value of a number of UEs for specific Network Slice, S-NSSAI is still within a valid bound, there is no negative affect in registration procedure. As optional, in a case of low consumption or high consumption of Policy counter values within a defined period, the updates of quota for a specific slice SLA parameter will be requested.

In a case of no negative effect on registration procedure, when the registration procedure of a UE is completed and successful, a PCF may receive information related to slice SLA to update the policy counter from a 5GC network function (e.g, UDM). Upon obtaining such information, the policy counter is updated. The policy counter value can be incremented if the registration procedure of a UE is completed successfully. If not, the policy counter will not be updated. If a de-registration information of a UE is received from a 5GC NF, the PCF will also update the policy counter by reducing one value of policy counter of specific slice SLA parameter. As optional, after obtaining the requested updates of quota for a specific slice SLA parameter, the PCF may update the policy counter information, accordingly, e.g., updating quota, thresholds, and status.

Step 1519:

A specific slice SLA parameter, maximum number of PDU sessions per Network Slice, can be controlled and enforced at PDU session establishment procedure. In particular, when a UE requests a PDU session establishment request, in coordination with the associated SMF instance, the PCF can monitor the status of the locally allowed quota of number of PDU sessions for the specific Network Slice and the enforcement can be done based on the status of locally allowed quota of UEs for the specific Network Slice. The enforcement of maximum number of PDU sessions per Network Slice can be done at "UE-requested PDU Session Establishment for non-roaming and roaming with local breakout" defined in the clause 4.3.2.2.1 in the 3GPP specification TS 23.502 v16.2.0. In particular, step 7*b* of FIG. 4.3.2.2.1-1 in the TS 23.502 specification can be specifically performed the policy enforcement procedure for the slice SLA parameter, maximum number of PDU sessions per Network Slice.

Basically, upon receiving a PDU session establishment request from a UE, an SMF 1505 interacts with PCF for SM policy association establishment/modification. Using the existing procedure between SMF and PCF, when a PCF receives such a request or a related request from SMF, PCF verifies the policy counter of a slice SLA parameter type, number of PDU sessions per Network Slice for a specific Network Slice information, e.g., S-NSSAI information received. If the local value of a number of PDU sessions for specific Network Slice, S-NSSAI is still within a valid bound, there is no negative affect in the procedure. As optional, in a case of low consumption or high consumption of Policy counter values within a defined period, the updates of quota for a specific slice SLA parameter will be requested.

In a case of no negative effect on the PDU session establishment procedure, when the PDU session establishment procedure of a UE is completed and successful, a PCF may receive an information related to slice SLA to update the policy counter from a 5GC NF (e.g, UDM 1507). Upon obtaining such information, the policy counter is updated. In particular, this step will appear after the step 14: PDU session response in FIG. 4.3.2.2.1-1: PDU session establishment procedure in the 3GPP specification TS 23.502. The policy counter value can be incremented if the procedure of a UE is completed successful. If not the policy counter will not be updated. If a de-establishment of PDU session information of a UE is received from a 5GC NF, the PCF will also update the policy counter by reducing one value of policy counter of specific slice SLA parameter. As optional, after obtaining the requested updates of Quota for a specific slice SLA parameter, the PCF may update the policy counter information accordingly, e.g., updating quota, thresholds, status, etc.

It is assumed that a PCF instance updates the status of locally configured policy counter for each slice SLA parameter of specific Network Slice(s) to update the global status. The notification updates by each PCF instance can be done periodically or event-based reporting (e.g., when a threshold has been crossed).

As optionally in step 1517 and step 1519, if a PCF figures out that the allowed quota of slice SLA parameter (e.g., UEs and/or PDU sessions) is too much in compare to the consumption, it can reduce some of its parts and notify the updates to the UDR/UDM. If a PCF is about to consume all of its part due to a high consumption of registration requests from the specific parameter of a specific Network Slice(s), it should ask for a larger part to grant more quota of specific slice SLA parameter from, e.g., UDR/UDM. Based on the global status of a specific slice SLA parameter of specific Network slice(s), the PCF can be granted or denied the request quota.

Figure 16:
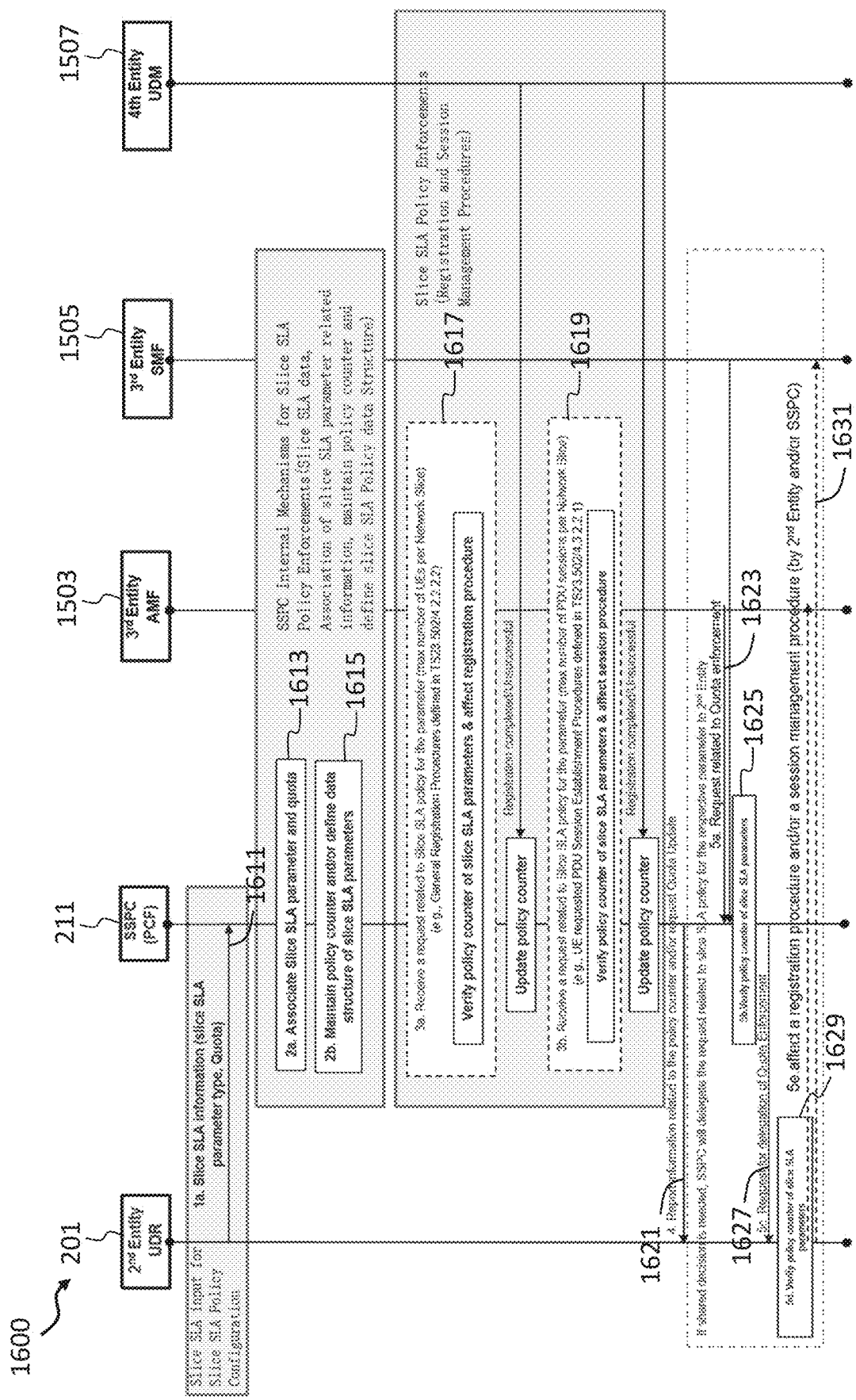
FIG. 16 shows a schematic diagram illustrating a procedure for slice SLA policy enforcement according to an embodiment.

In a further embodiment, FIG. 16 shows a schematic diagram illustrating a procedure 1600 for slice SLA policy enforcement, wherein steps 1611, 1613, 1615, 1617, and 1619 in this embodiment correspond to steps 1511, 1513, 1515, 1517, and 1519 of the embodiment shown in FIG. 15. The procedure 1600 further comprises the following steps:

Step 1621:

It is assumed that a PCF instance updates the status of locally configured policy counter for each slice SLA parameter of specific Network Slice(s) to update the global status. For example, the PCF can be triggered by the crossing of the thresholds or by a information received from NWDAF The notification updates by each PCF instance can be done periodically or event based reporting (e.g., when a threshold has been crossed). In addition to the Quota status updates, the PCF decide to request more quota. For example, the PCF instance sends a request to the $2^{nd}$ Entity (UDR/UDM) to receive Quota allocation update in the case of low utilization or high utilization.

Step 1623, 1625, 1627, 1629, 1631:

In the case of a PCF instance cannot determine the quota enforcement locally, based on the request relating to the control plane procedure of SLA related request, the request is delegated to the 2$^{nd}$ Entity 201 (e.g. UDR/UDM) to perform quota enforcement. In this case, the 2$^{nd}$ Entity 201 will check the status of global quota of the associated slice SLA parameter. It is assumed that the 2$^{nd}$ Entity 201 will also maintain the policy counter to manage and control the global quota status. Based on the policy counter status, the 2$^{nd}$ Entity 201 determines the enforcement and affect the control plane procedure, e.g., a registration procedure and/or a session management procedure. The effect to the control plane procedure can be managed solely by 2$^{nd}$ Entity 201 or can be performed in coordination with the SSPC 211. In the first case, the interaction takes place in between 2$^{nd}$ Entity 201 and the corresponding NFs will be involved. In the latter case, the interaction takes place in between 2$^{nd}$ Entity and the SSPC, so that the SSPC will delegate the decision (e.g., accept or allow or reject) to the involved NFs. If the SSPC instance (enforcement point) decides that a control plane procedure of SLA related request (e.g., UE registration request and/or PDU session establishment request) will violate or exceed the local quota, the SSPC triggers a rejection of the control plane procedure of SLA related request to the involved NFs and the Rejection message is sent to the UE by a serving NFs along with the back-off timer and a suitable cause value.

According to a further embodiment, as presented in FIG. 15, in step 1511, instead of the UDM/UDR 201, the PCF 211 may receive the slice SLA related information from the OAM. For example, the OAM allocates the quota of a specific slice SLA parameters across associated PCF instance(s) of the specific Network Slice(s). The quota allocation for local control at each PCF instance can be determined based on its capabilities (e.g., resources, sharing information). For example, the quota allocation of maximum number of allowed UEs per Network Slice per PCF instance is determined to use 60 to 70% of the available resources. In the case of a single PCF instance for the specific slice SLA parameter of associated network slice(s), the entire quota received in step 1511 will be allocated to the single PCF instance. The other steps are the same as in FIG. 15.

Figure 18:
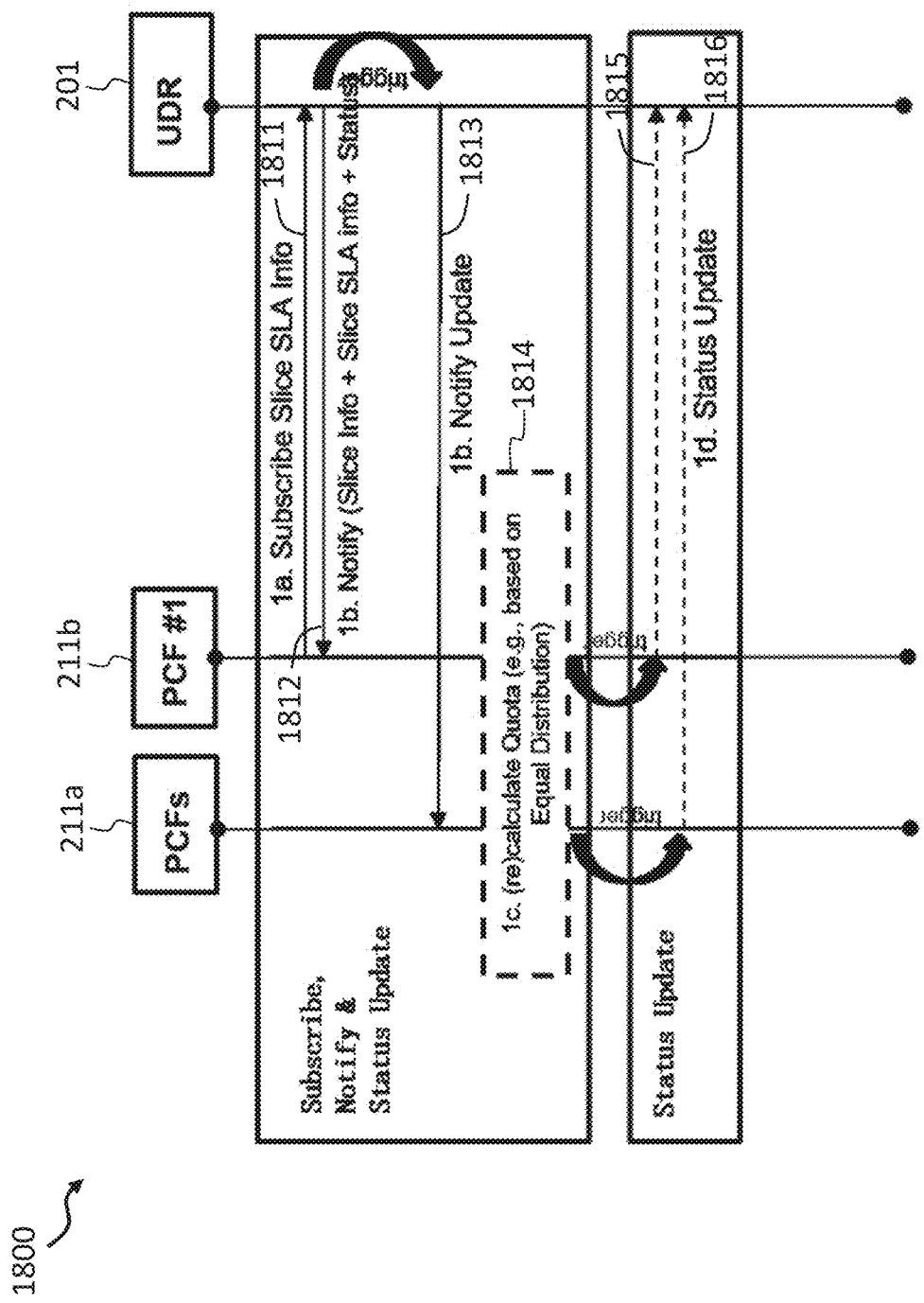
FIG. 18 shows a schematic diagram illustrating a procedure for quota allocation across multi-enforcement points according to an embodiment.

FIG. 18 shows a schematic diagram illustrating a procedure 1800 for quota allocation across multi-enforcement points according to an embodiment, wherein this procedure is performed between a plurality PCFs 211a, 211b and a UDM/UDR 201. This embodiment is related to step 1511 in FIG. 15, wherein, instead of receiving quota as a percentage of the SLO, the quota-related information can be obtained so that multiple enforcement points can distribute the quota among themselves, e.g., equal distribution or based on the capacity.

In this embodiment, the distribution of quota among enforcements points highlights 5GC NFs, UDR/UDM and PCF instances. The following system procedure highlights the step 1511 of the procedure 1500 in FIG. 15 with more details. After distribution of quota assignment over the active PCF instances (in coordination with UDM/UDR) according to the following steps, the remaining steps in the procedure 1500 in FIG. 15 can be followed accordingly. The procedure 1800 comprises the following steps:

Step 1811:
PCF #1 211b subscribes to quota assignment to UDM/UDR 201. It is assumed that there are already some active PCF instances where the quota of specific slice SLA parameter is distributed and allocated. It is assumed that UDM/UDR 201 stores the number of active PCF instances for the specific slice SLA parameter of specific Network Slice.

Step 1812, 1813:
Upon obtaining a subscription of slice SLA quota assignment, the UDM/UDR 201 provides Slice and/or Slice SLA info including quota-related information (e.g., SLA value and number of already subscribed other PCF instances). Simultaneously, the UDM/UDR 201 updates the other subscribed PCFs the status updates, e.g., the update of number of active PCF instance.

Step 1814:
Upon obtaining of information related to quota information, each PCF instance calculates the quota based on equal quota distribution (from the SLA value and the overall PCF number) or based on the capacity guidelines. In the later case, it is assumed that quota distribution is not equally distributed based on the capacity available.

Step 1815, step 1816:
In case of an issue with re-calculation of quota, the corresponding PCF instance(s) may allow some tolerance (e.g., without doing any actions for the already accepted number of UEs or PDU sessions in the case of re-calculated quota is lower than the actual value of the policy counter). The follow up notification/status update may be triggered to the UDM/UDR 201.

In an embodiment, steps 1815 and 1816 can be optional features.

Figure 19:
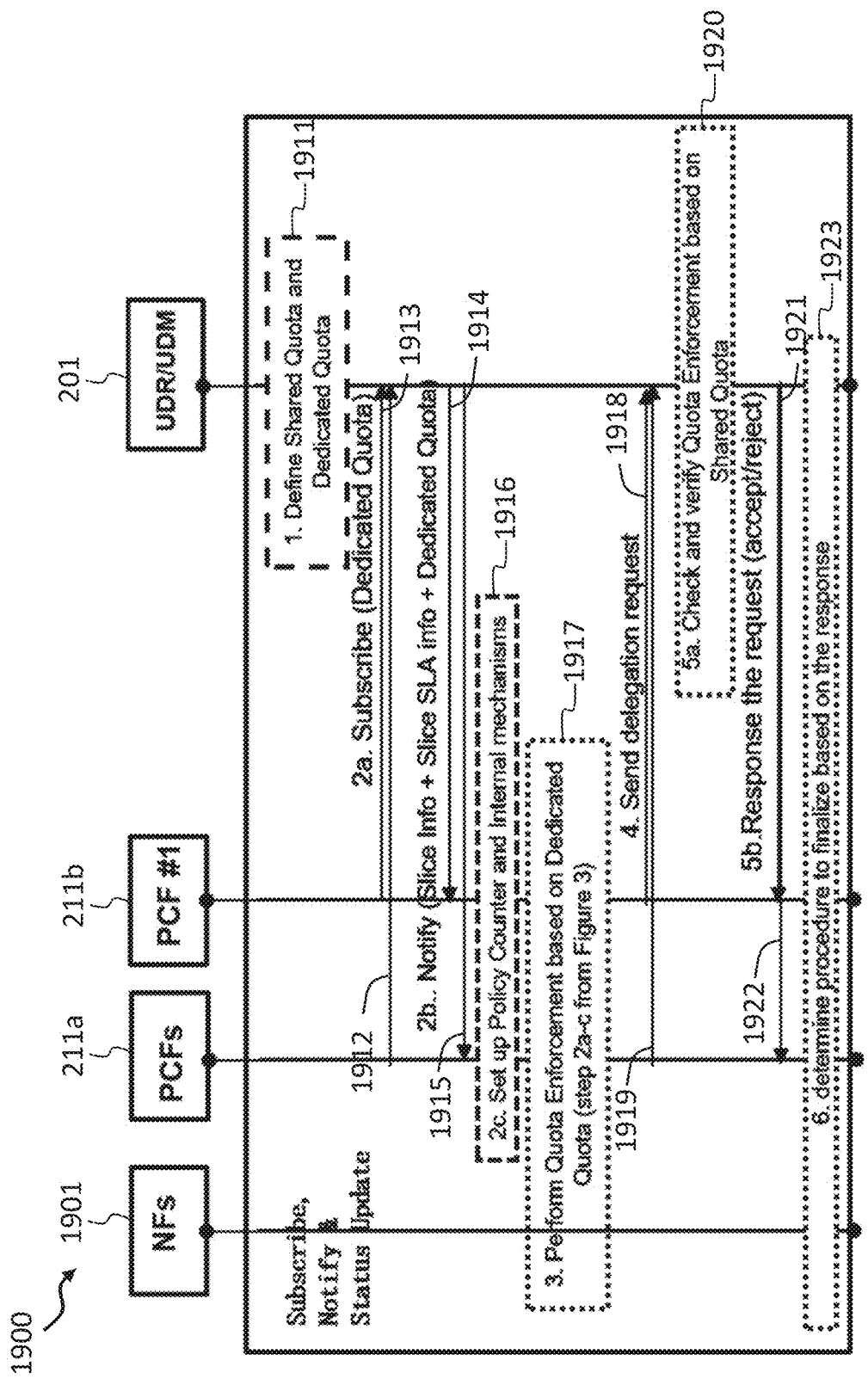
FIG. 19 shows a schematic diagram illustrating a procedure for quota allocation across multi-enforcement points according to an embodiment.

FIG. 19 shows a schematic diagram illustrating a procedure 1900 for quota allocation across multi-enforcement points according to an embodiment, wherein this procedure is performed between a plurality PCFs 211a, 211b and a UDM/UDR 201. The procedure 1900 comprises the following steps:

Step 1911:
The UDR/UDM 201 defines shared quota and distributes dedicated quotas to PCFs 211a, 211b.

Steps 19112, 1913:
The PCFs 211a, 211b subscribe dedicated quota.

Steps 1914, 1915, 1916:
Each PCF 211a, 211b receives their dedicated quota from the UDR/UDM 201 and configure a policy counter, policy data structure to support the internal behavior for enforcement of the received dedicated quota Step 1917:
Each PCF 211a, 211b (in parallel) receive request from NFs 1901 (e.g. SMF or AMF) that require the enforcement of the obtained dedicated quota until the dedicated quota is finished.

Step 1918:
Upon identification of no quota left, the PCF instance sends to UDM/UDR 201 a delegation message related to the quota enforcement to be performed (e.g., enforcement of registration SLO parameter).

Step 1920 or Steps 1921, 1922:
The UDM/UDR 201 upon receiving the delegation message, verifies the status of the shared quota. If possible, there is still available shared quota, the UDM/UDR 201 sends a message to requesting PCF instance allowing such instance to accept the procedure related to the SLO parameter. Alternatively, the UDR/UDM 201 will send a message to the PCF that the UDM 201 is taking over the enforcement. The PCF stops its processing, and the UDR/UDM will then interact with the NF requesting a procedure related to the SLO parameter.

Step 1923:
In the first case of steps 1921 and 1922, the PCF receives the delegation answer from UDM 201, and allows the procedure to finalize based on the response. In the latter case, the UDR/UDM 201 will then interact directly with the NF requesting a procedure related to the SLO parameter.

Figure 20:
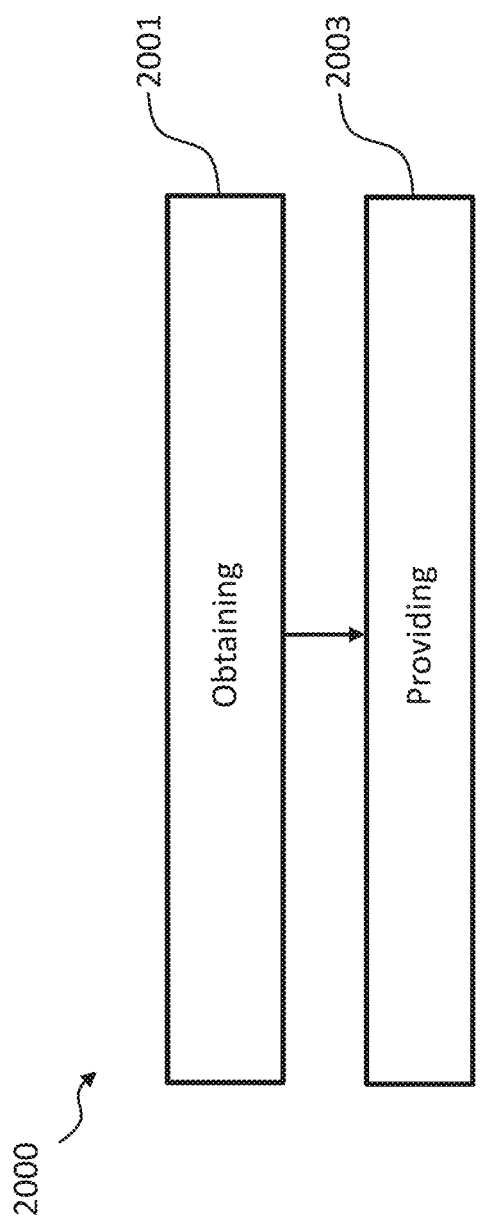
FIG. 20 shows a schematic diagram of a method according to an embodiment for controlling distribution of slice service level agreement (SLA) information of a network slice in a mobile communication network.

FIG. 20 shows a schematic diagram of a method 2000 for controlling distribution of slice service level agreement (SLA) information of a network slice in a mobile communication network. The method 2000 comprises the following steps: a first step 2001 of obtaining a plurality of slice SLA indications, wherein each slice SLA indication is obtained from a network control entity of a first plurality of network control entities; and a second step 2003 of providing to a network control entity local slice SLA information, wherein the local slice SLA information is based on the obtained plurality of slice SLA indications.

Figure 21:
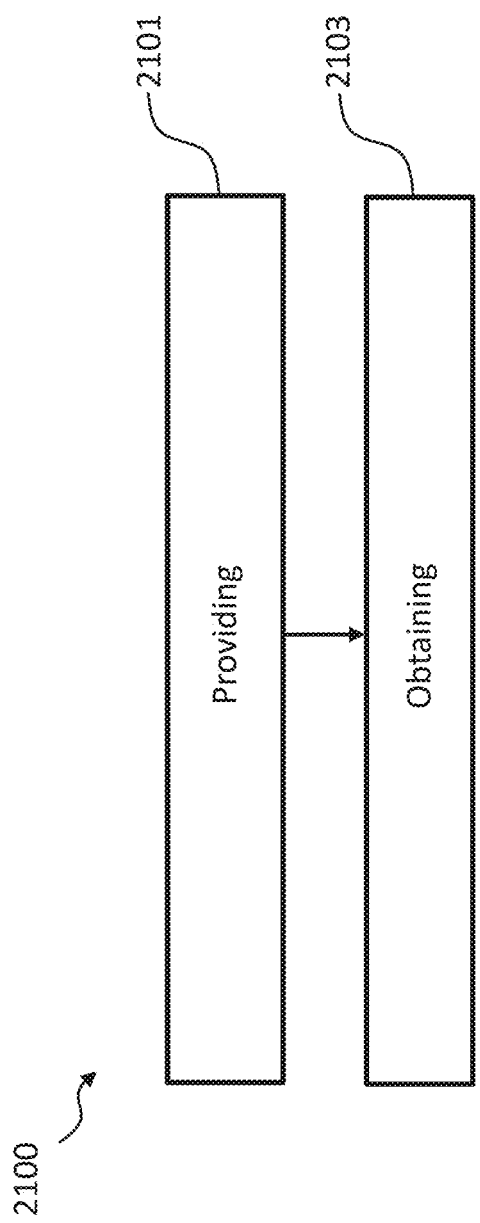
FIG. 21 shows a schematic diagram of a method according to an embodiment for supporting distribution of slice SLA information for a mobile communication network.

FIG. 21 shows a schematic diagram of a method 2100 for supporting distribution of slice service level agreement (SLA) information for a mobile communication network. The method comprises: a step 2101 of providing a plurality of slice SLA indications to a network entity for controlling distribution of slice SLA information of a network slice; and a further step 2103 of obtaining local slice SLA information related to a network slice from a second entity, wherein the local slice SLA information is based on the obtained plurality of slice SLA indications.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the present disclosure may be practiced otherwise than as specifically described herein.

What is claimed is:

1. A system for controlling distribution of slice service level agreement (SLA) information of a network slice in a mobile communication network, wherein the system comprises:
a plurality of network control entities; and
a network entity configured to:
obtain a plurality of slice SLA indications from the plurality of network control entities; and
provide local slice SLA information to at least one network control entity of the plurality of network control entities or to at least one other network control entity, wherein the local slice SLA information is based on the obtained plurality of slice SLA indications;
wherein the plurality of slice SLA indications comprises a delegation request of quota enforcement for enforcing a quota based on global slice SLA information; and
wherein the network entity is configured to manage and control a global quota status.

2. The system according to claim 1, wherein the local slice SLA information is further based on the global slice SLA information.

3. The system according to claim 1, wherein the network entity is further configured to provide to each of the plurality of network control entities a-corresponding local slice SLA information.

4. The system according to claim 1, wherein the delegation request comprises an SLA parameter, an identification of the network slice and/or an identification of the slice SLA information, and/or an identification of network operational procedures related to the SLA parameter; and
wherein the plurality of slice SLA indications further comprises at least one of:
local status information, wherein the local status information is based on a policy counter value related to the local slice SLA information of a network control entity; or
an update indication, wherein the update indication is based on a quota related to the local slice SLA information.

5. The system according to claim 1, wherein the delegation request comprises an SLA parameter, an identification of the network slice and/or an identification of the slice SLA information, and/or an identification of network operational procedures related to the SLA parameter; and
wherein the network entity is further configured to:
provide to another network entity a response to the delegation request, wherein the response to the delegation request comprises an acceptance or a rejection of the network operational procedures; or
provide the following to a network control entity:
the SLA parameter, the identification of the network slice and/or the identification of the slice SLA information, and/or the identification of network operational procedures related to the SLA parameter; and
an acceptance or a rejection indication for the network operational procedures.

6. The system according to claim 1, wherein the local slice SLA information or the global slice SLA information includes at least one of:
a network slice identification;
a mapping of subscribers identification to the network slice identification;
at least one slice SLA parameter and a corresponding service level objective (SLO);

at least one network operational procedure corresponding to the SLA parameter;
at least one quota, wherein the quota indicates an upper bound to network operational procedures;
a mapping of at least one network function identification and/or at least one network function set identification to the network slice identification; or
a mapping of at least one subscriber identification to at least one network operational procedure.

7. A network entity for controlling distribution of slice service level agreement (SLA) information of a network slice in a mobile communication network, wherein the network entity comprises:
a processor; and
a memory having processor-executable instructions stored thereon;
wherein the processor is configured to execute the processor-executable instructions to facilitate the following being performed by the network entity:
obtaining a plurality of slice SLA indications from a plurality of network control entities; and
providing local slice SLA information to at least one network control entity of the plurality of network control entities or to at least one other network control entity, wherein the local slice SLA information is based on the obtained plurality of slice SLA indications;
wherein the plurality of slice SLA indications comprises a delegation request of quota enforcement for enforcing a quota based on global slice SLA information; and
wherein the processor is configured to execute the processor-executable instructions to facilitate the following being performed by the network entity: managing and controlling a global quota status.

8. The network entity according to claim 7, wherein the local slice SLA information is further based on the global slice SLA information.

9. The network entity according to claim 7, wherein the processor is configured to execute the processor-executable instructions to facilitate the following being performed by the network entity: providing to each of the plurality of network control entities corresponding local slice SLA information.

10. The network entity according to claim 7, wherein the delegation request comprises an SLA parameter, an identification of the network slice and/or an identification of the slice SLA information, and/or an identification of network operational procedures related to the SLA parameter; and
wherein the plurality of slice SLA indications further comprises at least one of:
local status information, wherein the local status information is based on a policy counter value related to the local slice SLA information of a network control entity; or
an update indication, wherein the update indication is based on a quota related to the local slice SLA information.

11. The network entity according to claim 7, wherein the delegation request comprises an SLA parameter, an identification of the network slice and/or an identification of the slice SLA information, and/or an identification of network operational procedures related to the SLA parameter; and
wherein the processor is configured to execute the processor-executable instructions to facilitate the following being performed by the network entity:
providing to another network entity a response to the delegation request, wherein the response to the delegation request comprises an acceptance or a rejection of the network operational procedures; or
providing the following to a network control entity:
the SLA parameter, the identification of the network slice and/or the identification of the slice SLA information, and/or the identification of network operational procedures related to the SLA parameter; and
an acceptance or a rejection indication for the network operational procedures.

12. The network entity according to claim 7, wherein the local slice SLA information or the global slice SLA information includes at least one of a network slice identification;
a mapping of subscribers identification to the network slice identification;
at least one slice SLA parameter and a corresponding service level objective (SLO);
at least one network operational procedure corresponding to the SLA parameter;
at least one quota, wherein the quota indicates an upper bound to network operational procedures;
a mapping of at least one network function identification and/or at least one network function set identification to the network slice identification; or
a mapping of at least one subscriber identification to at least one network operational procedure.

13. A method for controlling distribution of slice service level agreement (SLA) information of a network slice in a mobile communication network, wherein the method comprises:
obtaining, by a network entity, a plurality of slice SLA indications from a plurality of network control entities; and
providing, by the network entity, local slice SLA information to at least one network control entity of the plurality of network control entities or to at least one other network control entity, wherein the local slice SLA information is based on the obtained plurality of slice SLA indications;
wherein the plurality of slice SLA indications comprises a delegation request of quota enforcement for enforcing a quota based on global slice SLA information; and
wherein the network entity manages and controls a global quota status.

14. The method according to claim 13, wherein the local slice SLA information is further based on the global slice SLA information.

15. The method according to claim 13, wherein the method further comprises:
providing to each of the plurality of network control entities corresponding local slice SLA information.

16. The method according to claim 13, wherein the delegation request comprises an SLA parameter, an identification of the network slice and/or an identification of the slice SLA information, and/or an identification of network operational procedures related to the SLA parameter; and
wherein the plurality of slice SLA indications further comprises at least one of:
local status information, wherein the local status information is based on a policy counter value related to the local slice SLA information of a network control entity; or
an update indication, wherein the update indication is based on a quota related to the local slice SLA information.

17. The method according to claim 13, wherein the delegation request comprises an SLA parameter, an identification of the network slice and/or an identification of the slice SLA information, and/or an identification of network operational procedures related to the SLA parameter; and
wherein the method further comprises:
providing to another network entity a response to the delegation request, wherein the response to the delegation request comprises an acceptance or a rejection of the network operational procedures; or
providing the following to a network control entity:
the SLA parameter, the identification of the network slice and/or the identification of the slice SLA information, and/or the identification of network operational procedures related to the SLA parameter; and
an acceptance or a rejection indication for the network operational procedures.

18. The method according to claim 13, wherein the local slice SLA information or the global slice SLA information includes at least one of a network slice identification;
a mapping of subscribers identification to the network slice identification;
at least one slice SLA parameter and a corresponding service level objective (SLO);
at least one network operational procedure corresponding to the SLA parameter;
at least one quota, wherein the quota indicates an upper bound to network operational procedures;
a mapping of at least one network function identification and/or at least one network function set identification to the network slice identification; or
a mapping of at least one subscriber identification to at least one network operational procedure.

19. A non-transitory computer-readable medium having processor-executable instructions stored for controlling distribution of slice service level agreement (SLA) information of a network slice in a mobile communication network, wherein the processor-executable instructions, when executed, facilitate performance of the following:

obtaining, by a network entity, a plurality of slice SLA indications from a plurality of network control entities; and
providing, by the network entity, local slice SLA information to at least one network control entity of the plurality of network control entities or to at least one other network control entity, wherein the local slice SLA information is based on the obtained plurality of slice SLA indications;
wherein the plurality of slice SLA indications comprises a delegation request of quota enforcement for enforcing a quota based on global slice SLA information; and
wherein the network entity manages and controls a global quota status.

20. The non-transitory computer-readable medium according to claim 19, wherein the delegation request comprises an SLA parameter, an identification of the network slice and/or an identification of the slice SLA information, and/or an identification of network operational procedures related to the SLA parameter; and
wherein the processor-executable instructions, when executed, further facilitate performance of the following:
providing to another network entity a response to the delegation request, wherein the response to the delegation request comprises an acceptance or a rejection of the network operational procedures; or
providing the following to a network control entity:
the SLA parameter, the identification of the network slice and/or the identification of the slice SLA information, and/or the identification of network operational procedures related to the SLA parameter; and
an acceptance or a rejection indication for the network operational procedures.

* * * * *

UNITED STATES PATENT AND TRADEMARK OFFICE
CERTIFICATE OF CORRECTION

| | | |
|---|---|---|
| PATENT NO. | : 12,225,402 B2 | Page 1 of 1 |
| APPLICATION NO. | : 17/740021 | |
| DATED | : February 11, 2025 | |
| INVENTOR(S) | : Poe et al. | |

It is certified that error appears in the above-identified patent and that said Letters Patent is hereby corrected as shown below:

In the Claims

Claim 3: Column 28, Line 26: "of network control entities a-corresponding local slice SLA" should read as -- of network control entities corresponding local slice SLA --.

Claim 12: Column 30, Line 13: "mation includes at least one of a network slice identification;" should read as -- mation includes at least one of:
a network slice identification; --.

Claim 18: Column 31, Line 19: "includes at least one of a network slice identification;" should read as -- includes at least one of:
a network slice identification; --.

Signed and Sealed this
Twenty-eighth Day of October, 2025

John A. Squires
*Director of the United States Patent and Trademark Office*